(12) United States Patent
Richardson

(10) Patent No.: US 10,556,204 B2
(45) Date of Patent: *Feb. 11, 2020

(54) PROCESSES AND METHODS USING CHLORINE DIOXIDE TO REMOVE NOX, SOX, ORGANIC COMPOUNDS, AND PARTICULATE MATTER FROM MARINE EXHAUST

(71) Applicant: Robert George Richardson, Shingletown, CA (US)

(72) Inventor: Robert George Richardson, Shingletown, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/876,182

(22) Filed: Jan. 21, 2018

(65) Prior Publication Data

US 2018/0140997 A1    May 24, 2018

Related U.S. Application Data

(63) Continuation-in-part of application No. 15/637,445, filed on Jun. 29, 2017, now Pat. No. 9,873,080, which
(Continued)

(51) Int. Cl.
*B01D 53/56* (2006.01)
*B01J 19/24* (2006.01)
(Continued)

(52) U.S. Cl.
CPC .............. *B01D 53/56* (2013.01); *B01D 53/50* (2013.01); *B01D 53/76* (2013.01); *B01F 3/04049* (2013.01); *B01F 5/0451* (2013.01);

*B01F 5/0466* (2013.01); *B01F 5/0618* (2013.01); *B01J 19/006* (2013.01);
(Continued)

(58) Field of Classification Search
CPC ............ B01D 53/1481; B01D 53/1456; B01D 53/50; B01D 2259/4566; B01D 53/501; B01D 53/505; B01D 53/56; B01D 53/74; B01D 53/75; B01D 53/76; B01D 53/78; B01D 2257/302; B01D 2257/404;
(Continued)

(56) References Cited

U.S. PATENT DOCUMENTS

| 4,004,966 A * | 1/1977 | Matty ................. B01D 53/501 162/30.1 |
| 9,873,080 B2 * | 1/2018 | Richardson .......... B01J 19/2405 |

* cited by examiner

*Primary Examiner* — Timothy C Vanoy
(74) *Attorney, Agent, or Firm* — Sandra Thompson; Finlayson Toffer

(57) ABSTRACT

Integrated exhaust gas systems, methods, and processes are disclosed that includes pretreatment, treatment and post-treatment processes arranged in a variety of reaction environments to address varied application requirements and end product requirements is described in this disclosure. In addition, a contemplated ballast water treatment system—that can be used in combination with the integrated exhaust gas systems can treat seawater and return it to storage within the vessel or send treated water back to the sea. This system can be sized to treat the seawater as it is leaving the ship without prior treatment, while the seawater is aboard or treat the seawater that is within the ship and add any additional treatment to the water, as the seawater leaves the ship. This system is not involved with pumping the seawater into the ship or filtering the water prior to storage as ballast water.

22 Claims, 14 Drawing Sheets

Related U.S. Application Data is a continuation-in-part of application No. 15/087,713, filed on Mar. 31, 2016, now Pat. No. 9,981,241, which is a continuation-in-part of application No. 14/666,199, filed on Mar. 23, 2015, now Pat. No. 9,757,687, which is a continuation of application No. 14/537,834, filed on Nov. 10, 2014, now Pat. No. 9,272,257, which is a continuation of application No. 14/126,403, filed as application No. PCT/US2013/050586 on Jan. 7, 2013, now Pat. No. 8,883,105.

(60) Provisional application No. 61/656,192, filed on Jun. 6, 2012, provisional application No. 61/715,149, filed on Oct. 17, 2012, provisional application No. 61/715,146, filed on Oct. 17, 2012, provisional application No. 61/584,347, filed on Jan. 9, 2012.

(51) Int. Cl.

| | | |
|---|---|---|
| *B01D 53/50* | (2006.01) | |
| *B01D 53/60* | (2006.01) | |
| *B01D 53/76* | (2006.01) | |
| *B01F 3/04* | (2006.01) | |
| *B01F 5/04* | (2006.01) | |
| *B01J 19/18* | (2006.01) | |
| *B01J 19/00* | (2006.01) | |
| *B01F 5/06* | (2006.01) | |
| *B01D 53/34* | (2006.01) | |

(52) U.S. Cl.
CPC ....... *B01J 19/1806* (2013.01); *B01J 19/2405* (2013.01); *B01D 53/346* (2013.01); *B01D 53/60* (2013.01); *B01D 2251/108* (2013.01); *B01D 2258/06* (2013.01); *B01D 2259/4508* (2013.01); *B01F 2005/0631* (2013.01); *B01F 2005/0639* (2013.01); *B01J 2219/00779* (2013.01); *Y02A 50/2344* (2018.01)

(58) Field of Classification Search
CPC .......... B01D 2258/01; B01D 2258/012; B01D 2258/0283
See application file for complete search history.

PROCESSES AND METHODS USING CHLORINE DIOXIDE TO REMOVE NOX, SOX, ORGANIC COMPOUNDS, AND PARTICULATE MATTER FROM MARINE EXHAUST

This patent application is a continuation-in-part of U.S. patent application Ser. No.: 15/637,445, which was filed on Jun. 29, 2017, which is a continuation-in-part of U.S. patent application Ser. No.: 15/087,713, which was filed on Mar. 31, 2016, which is a continuation-in-part of U.S. patent application Ser. No.: 14/666,199, which was filed on Mar. 23, 2015, which is a continuation of U.S. patent application Ser. No.: 14/537,834, which was filed on Nov. 10, 2014 and which is now U.S. Pat. No. 9,272,257, which is a continuation of U.S. patent application Ser. No.: 14/126,403, which was filed on Dec. 13, 2013, now U.S. Pat. No. 8,883,105, which is a National Phase application of PCT Application No.: PCT/US2013/020586, which claims priority to U.S. Provisional Application No.: 61/584,347 filed on Jan. 9, 2012, U.S. Provisional Application No.: 61/656,192 filed on Jun. 6, 2012, U.S. Provisional Application No.: 61/715,146, and U.S. Provisional Application No.: 61/715,149 filed on Oct. 17, 2012, all of which are incorporated by reference in their entirety.

FIELD OF THE SUBJECT MATTER

The field of the subject matter is removal of impurities and compounds from marine vessel exhaust, including NOx, SOx, organic compounds, particulates, particulate matter and combinations thereof, and in addition, the field of the subject matter includes control of invasive species in ballast water.

BACKGROUND

Environmental pollution is a problem adversely affecting the planet and its inhabitants. Fortunately, a majority of the individuals recognize the necessity of reducing the emission of greenhouse gases and the necessity of protecting our oceans.

One large source of pollution is maritime vessels, by virtue of the fact that the oceans cover a majority of the planet and there is a lot of maritime vehicle traffic. There are a number of conventional technologies that are designed to try to control the air pollution caused by combustion and water pollution associated with ballast water that is associated with maritime vessels, but it remains to be seen whether any of those technologies can successfully mitigate that pollution.

The International Maritime Organization (IMO) provides guidance and regulation for maritime vessels worldwide. There are three main areas identified by IMO as being the most destructive to our environment: exhaust sulfur dioxide ($SO_2$), exhaust oxides of nitrogen (NOx), and ballast water pollution associated with aquatic organisms.

Various literature discusses that seawater may be useful method for removing most of the $SO_2$ generated in combustion devices aboard vessels. Unfortunately, there are few published scientific studies addressing the removal efficiencies of seawater $SO_2$ scrubbers.

One study from Italy by G. Caiazzo (G. Caiazzo—Seawater $SO_2$ scrubbing in a tower for marine applications-Universita degli Studi di Napoli Federico II, Via Claudio 21, Napoli 80125, Italy) evaluates $SO_2$ removal efficiency base research that compares seawater scrubber residence time, liquid flow rate and $SO_2$ concentration. His findings show a maximum removal efficiency of 93% with a 3.4 second reaction residence time and a liquid to gas ratio of 0.01 to 1. This is a long residence time that will require a large scrubber vessel and an enormous amount of seawater flow through a full-scale device. It is noteworthy that the reported removal efficiency will not meet 2016 and 2020 International Maritime Organization (IMO) rules for $SO_2$ emissions when the vessel is using conventional fuels with 3.5% sulfur content. Those operating marine vessels will have to make a decision between using more expensive fuels and paying for combustion device upgrades to accommodate the low sulfur fuels or adding an additional $SO_2$ abatement device.

Most of the papers and patents that describe seawater treatments for $SO_2$ or $SO_x$ describe coarse spray devices or countercurrent scrubbers. CA1303822 discloses improved $SO_2$ adsorption by recirculating aqueous stream of sea water containing magnesium hydroxide and magnesium sulfite in a countercurrent packed bed scrubber.

Statoil's refinery at Mongstad, Norway has been using a seawater flue gas desulfurization unit that has a countercurrent packed bed scrubber. (See http://www.ogj.com/articles/print/volume-89/issue-26/in-this-issue/refining/seawater-scrubbing-removes-so2-from-refinery-flue-gases.html)

WO 1992008541 claims $SO_2$ and NOx abatement in a two-stage process that involves spray of seawater into ducting that precedes the first stage. The first stage apparently bubbles the exhaust gas into a pool of seawater for $SO_2$ abatement. The second stage NOx treatment is done in a packed bed scrubber that adds urea $(NH_2)_2CO$ to seawater at ambient temperatures. The patent application does not clearly identify the packing material in the NOx scrubber and there is no mention of a catalyst.

EP 3132839 describes a two-stage packed bed scrubber using seawater that has been pH adjusted by the addition of an alkaline material. There is no disclosure of removal efficiency.

There are several patents and patent publications directed to marine NOx abatement using SCR technology. None were found for marine NOx abatement using $(ClO_2)^0$. Some patents for selective catalytic reduction or "SCR" technology report removal efficiencies between 85% and 93%. These also incorporate soot blowers to clean off the catalyst beds. CN101922333B candidly identified the challenges associated with SCR catalyst poisoning and clogging associated with processing exhaust generated from high sulfur marine fuels. The concerns include: a) SCR catalyst can be poisoned by sulfur fuels; b) marine engine operating conditions change frequently—at low load conditions the exhaust temperature is too low to effectively utilize the SCR technology; and c) for safety reasons ships are unable to use ammonia and are required to use 40% aqueous urea which has supply and cost considerations. The patent clearly specified the reported technology is only applicable to marine fuels with less than 1.5% sulfur.

Particulate and particulate matter are also broadly recognized in scientific literature as a source of health issues. Environmental agencies in many countries have imposed regulatory requirements for particulate emissions from diesel engines and other sources. As will be discussed herein, diesel fuel exhaust has additional issues that require special consideration from a chemical treatment perspective. O. Sippula paper: Particle Emissions from Marine Engines: Chemical Composition and Aromatic Emission Profiles under Various Operating Conditions, 2014, American Chemical Society, provides comprehensive data describing the particles. Other scientific papers characterize particulate by particle number and particle mass. Literature teaches that most particles produced by combustion process in diesel engines are sized between 3 nm to 1 μm in diameter. The particles are distinguished by their distribution characteristic often described as "nucleation and accumulation". Particles below 30-50 nm in diameter are normally in the "nucleation" mode. By definition nucleation is the first step in the formation of either a new thermodynamic phase or new structure via self-assembly or self-organization. This group has less than 20% of the total particulate mass and up to 95% of the total number of particles. The second mode is call "accumulation" and it usually consists of particles ranging between 50 and 150 nm in diameter. This group contains most of the particle mass and lower particle count, and comprises agglomerated solid carbon particles together with associated absorbed heavy hydrocarbons as described in the previously mentioned paper by Sippula.

Regulatory requirements address particulate formation through restriction of sulfur content in marine fuels and via other means of regulatory compliance. However, in the Ushakov paper entitled: "Effects of High Sulphur Content in Marine Fuels on Particulate Matter Emission Characteristics"; Journal of Marine Engineering and Technology (2013), the reduction of fuel sulphur content to zero will not alone eliminate the problem of particulate matter emissions, since particulates and particulate matter are made up of a wide variety of components such as carbonaceous fractions, sulphates and water, partially burned fuel and lubrication oil, etc. Lowering fuel sulfur content thus has only limited potential in terms of particulate or particulate matter control.

To this end, it would be desirable to provide methods and related apparatus that can address exhaust contamination with various contaminants, including SOx and sulfur dioxide ($SO_2$), exhaust oxides of nitrogen (NOx), organic compounds, and particulates or particulate matter; and can address ballast water pollution associated with aquatic organisms that includes: a) a process that can be stand-alone addressing just exhaust gas or can be included with other abatement technologies such as ballast water treatment, wastewater treatment, drinking water treatment, and habitable space air treatment, b) serves the marine industry and other industries that utilize or have access to seawater, c) has relatively high removal efficiencies of SOx and sulfur dioxide ($SO_2$), exhaust oxides of nitrogen (NOx), organic compounds, and particulates or particulate matter, as compared with conventional technologies, d) has a relatively low overall operating cost, as compared with conventional technologies; and e) utilizes non-ionic chlorine dioxide $(ClO2)^0$ to accomplish these environmental services in whole or in part, and therefore, reduces equipment cost by cross-utilizing the facilities necessary to generate and regulate the production of $(ClO2)^0$.

SUMMARY OF THE SUBJECT MATTER

A pretreatment system or apparatus for removing SOx molecules from marine vessel exhaust gas, flue gas or contaminated gas stream, is disclosed that includes: a reaction chamber, comprising an interior area, a gas inlet at or near a first end of the chamber, and a gas outlet at or near a second end of the chamber; a water supply line that supplies a liquid, wherein the line is coupled with the inlet of the reaction chamber; a gas atomization nozzle array that is coupled to the water supply line and the reaction chamber, wherein the nozzle array sprays a blanket layer of small liquid droplets, wherein each droplet comprises a diameter, that create a high surface area of liquid across the interior surface of the reaction chamber or creates a mist that can interact with the contaminated gas, exhaust gas, or flue gas; a pH sensor coupled to the water supply line; at least one chemical metering pump coupled to the pH sensor and the water supply line, wherein the pump can provide an alkaline material into the water supply line to adjust the pH of the water before it is sprayed into the reaction chamber; and a drain coupled to the reaction chamber that removes liquid that accumulates in the reaction chamber, wherein the system or apparatus removes at least some of the SOx molecules from the contaminated gas, exhaust gas, or flue gas by converting at least some of the SOx molecules to sulfate ions.

A pretreatment method or process for removing SOx molecules from marine vessel contaminated gas, exhaust gas, or flue gas, includes: providing a reaction chamber, comprising an interior area, a gas inlet at or near a first end of the chamber, and a gas outlet at or near a second end of the chamber; providing a water supply line that supplies a liquid, wherein the line is coupled with the inlet of the reaction chamber; providing a gas atomization nozzle array that is coupled to the water supply line and the reaction chamber, wherein the nozzle array sprays a blanket layer of small liquid droplets, wherein each droplet comprises a diameter, that create a high surface area of liquid across the interior surface of the reaction chamber or creates a mist that can interact with the contaminated gas, exhaust gas, or flue gas; providing a pH sensor coupled to the water supply line; providing at least one chemical metering pump coupled to the pH sensor and the water supply line, wherein the pump can provide an alkaline material into the water supply line to adjust the pH of the water before it is sprayed into the reaction chamber; and providing a drain coupled to the reaction chamber that removes liquid that accumulates in the reaction chamber, wherein the system or apparatus removes at least some of the SOx molecule from the contaminated gas, exhaust gas, or flue gas by converting it to sulfate ions.

A gas stream component abatement or scrubbing system for marine vessel contaminated gas, exhaust gas, or flue gas, includes: a pretreatment system having a first end and second end, wherein the second end of the pretreatment reaction chamber is coupled with a first end or an inlet end of a second reaction chamber; and an inlet for introducing chlorine dioxide into the second reaction chamber, wherein the second reaction chamber is equipped with one or more turbulence inducing devices configured for inducing turbulence, wherein the turbulence inducing device is a stationary device, and wherein the exhaust gas or gas to be treated from the first reaction chamber travels from the outlet end of the first reaction chamber to the first end or inlet end of the second reaction chamber.

A gas stream component abatement or scrubbing system for marine vessel contaminated gas, exhaust gas, or flue gas, includes: a contemplated pretreatment system, wherein the second end of the pretreatment reaction chamber is coupled with a first end or an inlet end of a second reaction chamber; and an inlet for introducing chlorine dioxide into the second reaction chamber, wherein the second reaction chamber is equipped with one or more turbulence inducing devices configured for inducing turbulence, wherein the turbulence inducing device is a stationary device, and wherein the exhaust gas or gas to be treated from the first reaction chamber travels from the outlet end of the first reaction chamber to the first end or inlet end of the second reaction chamber.

A gas stream component abatement or scrubbing system for marine vessel contaminated gas, exhaust gas, or flue gas, includes: a contemplated pretreatment system, wherein the pretreatment reaction chamber is also utilized for scrubbing NOx, SOx, or a combination thereof; and an inlet for introducing chlorine dioxide into the reaction chamber, wherein the reaction chamber is equipped with one or more turbulence inducing devices configured for inducing turbulence, wherein the turbulence inducing device is a stationary device, and wherein the exhaust gas remains in the reaction chamber for treatment with non-ionic chlorine dioxide.

A gas stream component abatement or scrubbing system for marine vessel contaminated gas, exhaust gas, or flue gas, includes: a pretreatment system having a first end and a second end, wherein the second end of the pretreatment reaction chamber is coupled with a first end or an inlet end of a second reaction chamber; an inlet for introducing chlorine dioxide into the second reaction chamber, wherein the second reaction chamber is equipped with one or more turbulence inducing devices configured for inducing turbulence, wherein the turbulence inducing device is a stationary device, and wherein the exhaust gas or gas to be treated from the pretreatment reaction chamber travels from the outlet end of the pretreatment reaction chamber to the first end or inlet end of the second reaction chamber; and an inlet for a post-treatment chamber that is coupled with the second end of the second reaction chamber, wherein at least one product of the second reaction chamber travels into the inlet of the post-treatment chamber.

A gas stream component abatement or scrubbing system for marine vessel contaminated gas, exhaust gas, or flue gas, includes: a contemplated pretreatment system, wherein the second end of the pretreatment reaction chamber is coupled with a first end or an inlet end of a second reaction chamber; an inlet for introducing chlorine dioxide into the second reaction chamber, wherein the second reaction chamber is equipped with one or more turbulence inducing devices configured for inducing turbulence, wherein the turbulence inducing device is a stationary device, and wherein the exhaust gas or gas to be treated from the pretreatment reaction chamber travels from the outlet end of the pretreatment reaction chamber to the first end or inlet end of the second reaction chamber; and an inlet for a post-treatment chamber that is coupled with the second end of the second reaction chamber, wherein at least one product of the second reaction chamber travels into the inlet of the post-treatment chamber.

A gas stream component abatement or scrubbing system for marine vessel contaminated gas, exhaust gas, or flue gas, includes: a contemplated pretreatment system, wherein the pretreatment reaction chamber is also utilized for scrubbing NOx, SOx, or a combination thereof; an inlet for introducing chlorine dioxide into the pretreatment reaction chamber, wherein the reaction chamber is equipped with one or more turbulence inducing devices configured for inducing turbulence, wherein the turbulence inducing device is a stationary device, and wherein the exhaust gas remains in the reaction chamber for treatment with non-ionic chlorine dioxide; and an inlet for the introduction of seawater, potable water with additional metal hydroxides, tainted water with additional metal hydroxides, or pure water with additional metal hydroxides in order to neutralize the mineral acids that are produced reaction chamber.

A gas stream component abatement or scrubbing system for marine vessel contaminated gas, exhaust gas, or flue gas, wherein the gas stream comprises organic compounds, the system includes: a contemplated pretreatment system, wherein the second end of the pretreatment reaction chamber is coupled with a first end or an inlet end of a second reaction chamber; and an inlet for introducing chlorine dioxide into the second reaction chamber, an inlet for introducing at least one sulfur-based component, compound or group of compounds into the second reaction chamber, wherein the second reaction chamber is equipped with one or more turbulence inducing devices configured for inducing turbulence, wherein the turbulence inducing device is a stationary device, and wherein the exhaust gas or gas to be treated from the first reaction chamber travels from the outlet end of the first reaction chamber to the first end or inlet end of the second reaction chamber.

BRIEF DESCRIPTION OF THE FIGURES

FIG. 10A shows the use of $(ClO_2)^0$ suspended in gas. FIG. 10B shows the use of $(ClO_2)^0$ suspended in liquid.

FIG. 11A shows the SOx PT as a separate unit and the NOx, SOx, organic compounds, particulates, particulate matter and combinations thereof TM combined with the PSGPC in a single module. FIG. 11B shows all three functions combined into a single module.

DETAILED DESCRIPTION

Figure 1:
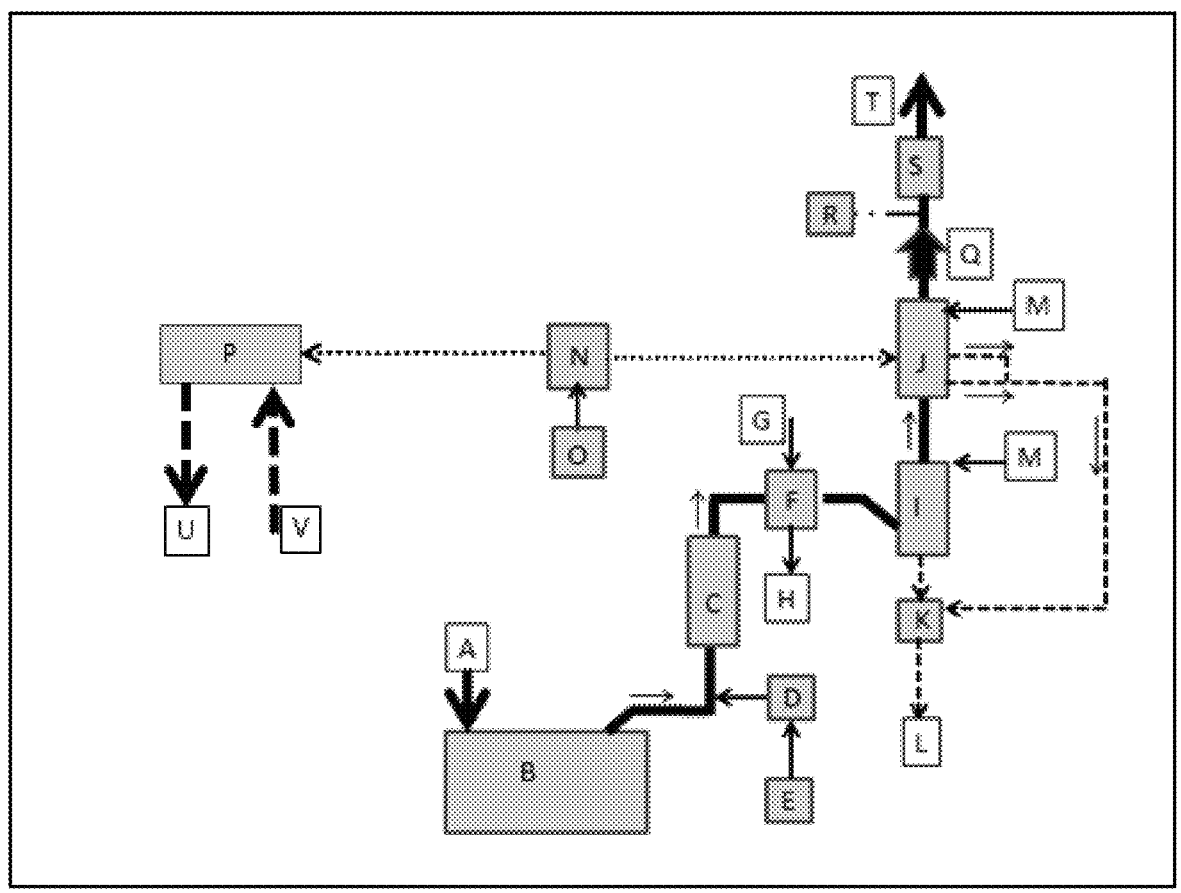
FIG. 1 shows an example of an integrated package of a contemplated exhaust gas treatment and ballast water treatment.

To address the problems with the prior art and conventional technologies, methods, systems, processes, and related apparatus that can address exhaust sulfur oxides (SOx), including sulfur dioxide ($SO_2$), exhaust oxides of nitrogen (NOx), organic compounds, exhaust organic compounds, particulates, particulate matter, exhaust, and ballast water pollution associated with aquatic organisms have been developed and are disclosed herein that include: a) a process that can be stand-alone addressing just exhaust gas or can be included with other abatement technologies such as ballast water treatment, wastewater treatment, drinking water treatment, and habitable space air treatment, b) serves the marine industry and other industries that utilize or have access to seawater, c) has relatively high removal efficiencies of SOx and sulfur dioxide ($SO_2$), exhaust oxides of nitrogen (NOx), organic compounds, and particulates or particulate matter, as compared with conventional technologies, d) has a relatively low overall operating cost, as compared with conventional technologies; and e) utilizes non-ionic chlorine dioxide $(ClO_2)^0$ to accomplish these environmental services, and therefore, reduces equipment cost by cross-utilizing the facilities necessary to generate and regulate the production of $(ClO_2)^0$. Contemplated embodiments that utilize seawater overcome several challenges, including the challenge that conventional processes are detrimentally impacted by changes in seawater alkalinity.

Systems of treatment processes for most, if not all, aspects of marine exhaust and ballast water treatment are disclosed herein, wherein each phase individually contains unique characteristics, but when combined in various combinations surprisingly and synergistically work together to produce additional unique characteristics to meet specific abatement requirements.

There are at least seven distinct processes and systems, with corresponding apparatus, that will be described in detail herein—each alone and in combination with each other:

Pretreatment of sulfur dioxide (SOx) in marine combustion exhaust (marine exhaust)

Treatment of nitrogen oxides (NOx) and SOx in marine exhaust

Post-treatment of reaction products from earlier stages to produce compounds that are environmentally friendly and/or may have commercial value Treatment of airborne organic compounds and agglomerated organic compounds (sometimes referred to as "soot") buildup on marine exhaust equipment components Treatment of particulate resulting from hydrocarbon combustion Removal of nitrogen compound byproducts from water that are the result of marine exhaust NOx abatement Marine ballast water treatment of invasive and regulated marine organisms The contemplated disclosures may be combined among themselves and/or with other known/conventional exhaust gas technology to provide abatement advantages that have not been previously reported in the literature.

Contemplated embodiments include a series of methods, systems, and processes that utilize non-ionic gas phase chlorine dioxide $(ClO_2)^0$ and other compounds and components to remove nitrogen oxides, sulfur oxides, organic compounds that are suspended in gas and agglomerated on objects (OC's) and particulate and particulate matter from combustion exhaust gas and exhaust system components and abate biological organisms in marine ballast water. As will be described herein and disclosed in the examples, contemplated systems and processes for treating exhaust gas and ballast water can be accomplished in a module or a combination of modules that can share a common source of chlorine dioxide input or generation.

An integrated solution that addresses the SOx, NOx, OC's, particulate and ballast water pollution issues using the same $(ClO_2)^0$ molecule in seven different reactions/applications disclosed herein.

In some contemplated embodiments, a SOx pre-treatment scrubber module overcomes limitations found in other patented and published $SO_2$ or SOx scrubbers. Cost and space savings are also realized by integrating and utilizing contemplated embodiments because the NOx, SOx, organic compounds, particulates, particulate matter and combinations thereof removal/abatement, along with the ballast seawater treatment, can utilize the same chemical constituents and can take place in the same process reactor/process reactor system.

There are a number of advantages and features of contemplated processes that include ballast seawater treatment, which include:

A contemplated ballast water treatment system can treat seawater and return it to storage within the vessel or send treated water back to the sea. This system can be sized to treat the seawater as it is leaving the ship without prior treatment, while the seawater is aboard or treat the seawater that is within the ship and add any additional treatment to the water, as the seawater leaves the ship. This system is not involved with pumping the seawater into the ship or filtering the water prior to storage as ballast water.

The automated control and sensor system for the ballast water treatment system is part of the overall contemplated control system. This provides the vessels crew with the ability to determine the concentration of $(ClO_2)^0$ desired in the ballast water and verify that the desired concentration is present.

Figure 3:
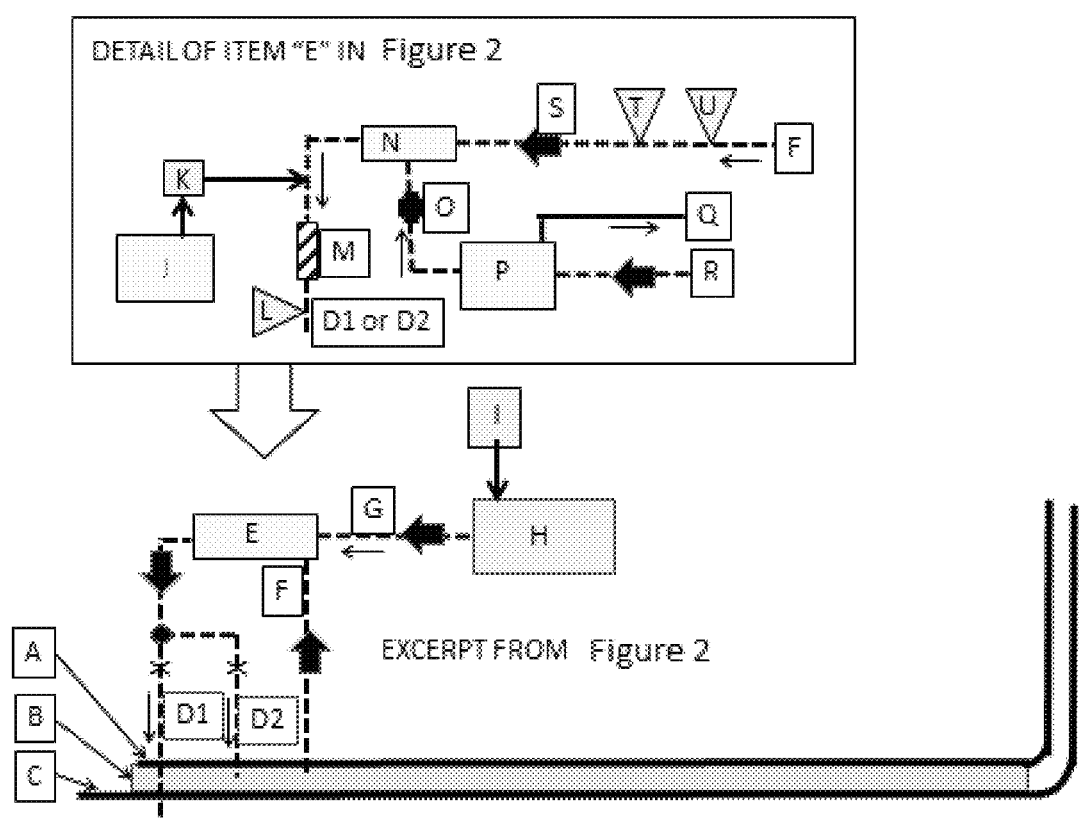
FIG. 3 shows in detail the actual $(ClO_2)^0$ dosing and control methodology for the ballast water module included in the rectangle marked "E" on FIG. 2.

The ballast water treatment system depicted in FIG. 3 utilizes the same $(ClO_2)^0$ generator that supplies gas phase $(ClO_2)^0$ to the contemplated NOx, SOx, organic compounds, particulates, particulate matter and combinations thereof abatement technology, which saves space on the ship or vessel. The generator can be sized to do both tasks at the same time or to just handle one at a time.

A contemplated system utilizes an infrared detector that determines $(ClO_2)^0$ concentration via unique optical absorption characteristics. This choice of technology avoids the measurement confusion and problems associated with the use of oxidation-reduction potential or "ORP" for determination of $(ClO_2)^0$ concentration. ORP by its very design measures the oxidation and reduction of any compounds in the liquid being tested, which leads to confusion in complicated solutions like seawater with many ions that can influence an ORP reading.

A contemplated system automatically measures and adjusts the seawater pH to a predetermined set point that is compliant with IMO regulations and other regulations. The pH adjustment system can be sized to treat the seawater as it is being returned to the ocean without prior adjustment while onboard the vessel or a smaller version of the technology can pretreat the seawater pH while being held on the vessel and make minor adjustments as the seawater is discharged to the sea.

The characteristics and uniqueness resulting from combinations of processes is best described by defining the physical structures that are utilized as a part of this disclosure. As used herein, the term "chamber" means a contained reaction environment with an access point near one end for the introduction of exhaust gas, a volume of any shape for the containment of chemical and physical transformations to the exhaust gas, a discharge point for the treated exhaust gas that is at or near the opposite end of the chamber, various connection points for the introduction of other chemicals in gas or liquid phase, drains for liquid waste products and physical devices within the volume for mixing and other physical change to the reaction mixture. A chamber can contain a single process or contain two or more processes that occur in sequence as the exhaust gas moves from one end of the chamber to the other.

As used herein, the term "module" means a physically distinct vessel that is connected in series or in parallel with other modules to create the combined treatment process. Each module is unique in its combination of chambers or reaction chambers. Some have just one chamber that facilitates a single process, some have a single chamber that provide a series of processes, and some include a series of chambers each facilitating one or more processes. The Examples section conveys some of the possible combinations of features, but it should be understood that these examples are not limiting and one of ordinary skill in the art should understand how these modules and chambers can be utilized alone or in combination. Each contemplated process will be described separately, in order to establish a baseline understanding of each one, and then the combination of those processes and their advantages will be disclosed for reference purposes.

In some embodiments, a pretreatment system or apparatus for removing SOx molecules from marine vessel exhaust or flue gas, is disclosed that includes: a reaction chamber, comprising an interior area, a gas inlet at or near a first end of the chamber, and a gas outlet at or near a second end of the chamber; a water supply line that supplies a liquid, wherein the line is coupled with the inlet of the reaction chamber; a gas atomization nozzle array that is coupled to the water supply line and the reaction chamber, wherein the nozzle array sprays a blanket layer of small liquid droplets that create a high surface area of liquid across the interior surface of the reaction chamber or creates a mist that can interact with the gas, exhaust or flue gas; a pH sensor coupled to the water supply line; at least one chemical metering pump coupled to the pH sensor and the water supply line, wherein the pump can provide an alkaline material into the water supply line to adjust the pH of the water before it is sprayed into the reaction chamber; and a drain coupled to the reaction chamber that removes liquid that accumulates in the reaction chamber, wherein the system or apparatus removes at least some of the SOx molecules from the exhaust gas by converting it to sulfate ions. In some embodiments, an exhaust or flue gas supply line that supplies an exhaust gas or a flue gas to the system is provided or included.

A pretreatment method or process for removing SOx molecules from marine vessel exhaust or flue gas, is disclosed that includes: providing a reaction chamber, comprising an interior area, a gas inlet at or near a first end of the chamber, and a gas outlet at or near a second end of the chamber; providing a water supply line that supplies a liquid, wherein the line is coupled with the inlet of the reaction chamber; providing a gas atomization nozzle array that is coupled to the water supply line and the reaction chamber, wherein the nozzle array sprays a blanket layer of small liquid droplets that create a high surface area of liquid across the interior surface of the reaction chamber or creates a mist that can interact with the gas, exhaust or flue gas; providing a pH sensor coupled to the water supply line; providing at least one chemical metering pump coupled to the pH sensor and the water supply line, wherein the pump can provide an alkaline material into the water supply line to adjust the pH of the water before it is sprayed into the reaction chamber; and providing a drain coupled to the reaction chamber that removes liquid that accumulates in the reaction chamber, wherein the system or apparatus removes at least some of the SOx molecule from the exhaust gas by converting it to sulfate ions. In some embodiments, an exhaust or flue gas supply line that supplies an exhaust gas or a flue gas to the system is provided or included.

In another embodiment, a pretreatment system or apparatus for removing SOx molecules from marine vessel exhaust or flue gas, is disclosed that includes: a reaction chamber, comprising an interior area, a gas inlet at or near a first end of the chamber, and a gas outlet at or near a second end of the chamber; a seawater supply line that supplies seawater; an exhaust or flue gas supply line that supplies an exhaust gas or a flue gas, wherein the line is coupled with the inlet of the reaction chamber; a gas atomization nozzle array that is coupled to the seawater supply line and the reaction chamber, wherein the nozzle array sprays a blanket layer of small liquid droplets that create a high surface area of seawater across the interior surface of the reaction chamber or creates a mist that can interact with the gas, exhaust or flue gas; a pH sensor coupled to the seawater supply line; at least one chemical metering pump coupled to the pH sensor and the seawater supply line, wherein the pump can provide an alkaline material into the seawater supply line to adjust the pH of the seawater before it is sprayed into the reaction chamber; and a drain coupled to the reaction chamber that removes liquid that accumulates in the reaction chamber, wherein the system or apparatus removes at least some of the SOx molecules from the exhaust gas by converting it to sulfate ions. This conversion reaction proceeds as follows:

$$5SO_2+2ClO_2+6H_2O \rightarrow 5H_2SO_4+2HCl \qquad [1]$$

A pretreatment method or process for removing SOx molecules from marine vessel exhaust or flue gas, is disclosed that includes: providing a reaction chamber, comprising an interior area, a gas inlet at or near a first end of the chamber, and a gas outlet at or near a second end of the chamber; providing a seawater supply line that supplies seawater; providing an exhaust or flue gas supply line that supplies an exhaust gas or a flue gas, wherein the line is coupled with the inlet of the reaction chamber; providing a gas atomization nozzle array that is coupled to the seawater supply line and the reaction chamber, wherein the nozzle array sprays a blanket layer of small liquid droplets that create a high surface area of seawater across the interior surface of the reaction chamber or creates a mist that can interact with the gas, exhaust or flue gas; providing a pH sensor coupled to the seawater supply line; providing at least one chemical metering pump coupled to the pH sensor and the water supply line, wherein the pump can provide an alkaline material into the water supply line to adjust the pH of the water before it is sprayed into the reaction chamber; and providing a drain coupled to the reaction chamber that removes liquid that accumulates in the reaction chamber, wherein the system or apparatus removes at least some of the SOx molecule from the exhaust gas by converting it to sulfate ions.

As contemplated herein, the "water supply line" may provide any type of water, including seawater, pure water, potable water, or tainted water. In some embodiments, metal hydroxides, carbonates, biocarbonates, ammonia, or a combination thereof—herein referred to as "alkali materials"—may be added to the water. As contemplated herein, the "seawater supply line" provides seawater alone or with additional materials, as described herein.

As used herein, the phrase "small diameter liquid droplets" refers to droplets that are less than or equal to about 30 microns in mean diameter. In some embodiments, small droplets refer to droplets that are less than or equal to about 25 microns in mean diameter. In other embodiments, small droplets refer to droplets that are less than or equal to about 20 microns in mean diameter. In yet other embodiments, small droplets refer to droplets that are less than or equal to about 10 microns in mean diameter. It should be understood that these contemplated small diameter liquid droplets also have a higher surface area when combined with other small diameter liquid droplets, as compared with a combination of larger diameter liquid droplets.

In some embodiments, the droplets may be formed by gas atomizing nozzles or non-gas atomizing nozzles, depending on the application needed at the time. In other embodiments, atomizing nozzles may comprise one of the two different process forms: externally mixed gas/liquid atomizing nozzles or internally mixed gas/liquid nozzles. The BETE XAPF is an example of a gas atomizing flat fan internal gas liquid mixing nozzle. The BETE XAER is an example of a gas atomizing round spray external mix nozzle. In yet other embodiments, contemplated atomizing nozzles may be of a gas-type or a hydraulic-type atomizing nozzle.

It should be understood that phrases like NOx/SOx process and NOx/SOx treatment module are used interchangeably and denote the treatment of a gas stream, exhaust gas, flue gas, or any other contaminated gas stream, wherein any of these gas streams are contaminated with at least one NOx compound, SOx compound, organic compound, particulate, particulate matter, or a combination thereof. Many of these processes described as SOx and NOx/SOx based function well to also reduce or remove organic compounds, particulates, and/or particulate matter.

A NOx, SOx, organic compounds, particulate matter or a combination thereof abatement or scrubbing process, system, or method for marine vessel flue gas, herein referred to as the NOx, SOx, organic compounds, particulates, particulate matter and combinations thereof process, is disclosed, which may occur by itself in a chamber or be combined with the previously described pretreatment SOx process in a single chamber. When the chamber used for the NOx, SOx, organic compounds, particulates, particulate matter and combinations thereof process does not include the SOx pretreatment process, the second end of the pretreatment system reaction chamber is coupled with a first end of the chamber containing the NOx, SOx, organic compounds, particulates, particulate matter and combinations thereof process.

In some contemplated embodiments, a NOx, SOx, organic compounds, particulates, particulate matter and combinations thereof "treatment module" (NOx/SOx TM) comprises an abatement or scrubbing process, system or method for NOx, SOx, or a combination thereof in marine vessel flue gas or other gas. Contemplated NOx, SOx, organic compounds, particulates, particulate matter and combinations thereof TM process, as disclosed, may occur or be activated by itself in a chamber or be combined with the previously described SOx pretreatment module (SOx PT) in a single chamber. When integrated the treatment module process does not include a separate SOx pretreatment module.

In some contemplated NOx, SOx, organic compounds, particulates, particulate matter and combinations thereof process applications that include the SOx pretreatment process and the NOx, SOx, organic compounds, particulates, particulate matter and combinations thereof process in the same module or reaction chamber the gas inlet at or near the first end of the combined process chamber is connected to the exhaust gas stream. In both embodiments, the chamber or portion of the chamber used for the NOx, SOx, organic compounds, particulates, particulate matter and combinations thereof process, there is an inlet for introducing chlorine dioxide into the portion of the reaction chamber used for the NOx, SOx, organic compounds, particulates, particulate matter and combinations thereof reaction. In addition, the NOx, SOx, organic compounds, particulates, particulate matter and combinations thereof portion of a reaction chamber is equipped with one or more turbulence inducing devices configured for inducing turbulence, wherein the turbulence inducing device is a stationary device, and wherein the exhaust gas or gas to be treated is drawn through the length of the reaction chamber by lower differential pressure at the discharge or second end of the chamber used for NOx, SOx, organic compounds, particulates, particulate matter and combinations thereof than the inlet or first end of that same reaction chamber.

In other contemplated NOx, SOx, organic compounds, particulates, particulate matter and combinations thereof process applications that include the SOx pretreatment process and the NOx, SOx, organic compounds, particulates, particulate matter and combinations thereof process in the same module, the gas inlet at or near the first end of the combined process is connected to the exhaust gas stream. In both embodiments, the chamber or portion of the module used for the NOx, SOx, organic compounds, particulates, particulate matter and combinations thereof process comprises an inlet for introducing $(ClO_2)^0$ into the portion of the reaction chamber used for the NOx, SOx, organic compounds, particulates, particulate matter and combinations thereof reaction. The device used to introduce the $(ClO_2)^0$ into the gas stream can be a Venturi device or other device that by design and function will draw the $(ClO_2)^0$ into the exhaust gas or other gas stream. In addition, the NOx, SOx, organic compounds, particulates, particulate matter and combinations thereof reaction chamber is equipped with one or more turbulence inducing devices configured for inducing turbulence, wherein the turbulence inducing device is a stationary device.

The reactions occur in accordance with the following equations in all types of exhaust gas generated from combustion of fuel, wherein the fuel has three or less carbon atoms in its chain length, and other gas stream containing minimal concentrations of organic compounds:

$$5NO + 2(ClO_2)^0 + H_2O \rightarrow 5NO_2 + 2HCl \quad [2]$$

$$5NO_2 + (ClO_2)^0 + 3H_2O \rightarrow 5HNO_3 + HCl \quad [3]$$

$$5SO_2 + 2(ClO_2)^0 + 6H_2O \rightarrow 5H_2SO_4 + 2HCl \quad [4]$$

Exhaust gas generated from combustion of fuel with four or more carbon atoms in its chain length will be discussed later herein.

When seawater is used in pretreatment module that is combined with the NOx, SOx, organic compounds, particulates, particulate matter and combinations thereof module, the process, equation 5 is also applicable:

$$6SO_3^{-2} + 2(ClO_2)^0 12H^+ \rightarrow H_2S_2O_6 + 4H_2SO_4 + 2HCl \quad [5]$$

A contemplated NOx, SOx, organic compounds, particulates, particulate matter and combinations thereof treatment module can also be combined with post treatment processes in a number of embodiments. The SOx pretreatment process, NOx, SOx, organic compounds, particulates, particulate matter and combinations thereof process and post treatment processes may be combined in a number of embodiments with other pretreatment NOx abatement processes such as Selective Catalytic Reduction (SCR) described in prior art. Each of embodiments is identified as a unique module. Some of the modules, systems, or processes are described in the Examples section.

Specifically, a contemplated marine NOx, SOx, organic compounds, particulates, particulate matter and combinations thereof treatment module or system comprises an apparatus or system for removing NOx and or SOx or a combination of both molecules from marine vessel exhaust or flue gas, or gas from another source and is the best treatment method for exhaust produced from combustion of C4 or longer hydrocarbon fuels, is disclosed that includes two reaction chambers in series: a first reaction chamber, comprising an interior area, a gas inlet at or near a first end of the module and first chamber, and a gas outlet at or near the middle of the module a second end of the first chamber; an inlet for introducing $(ClO_2)^0$ into the reaction chamber at a point near the first opening, wherein the reaction chamber is equipped with one or more turbulence inducing devices downstream of the inlet for $(ClO_2)^0$ configured for inducing turbulence, wherein the turbulence inducing device is a stationary device, and wherein the exhaust gas or gas to be treated is mixed with $(ClO_2)^0$ and allowed sufficient residence time to react with the NOx and or SOx before the gas leaves the first chamber through an air/water separator or similar device at or near the second end of the first reaction chamber.

The second reaction chamber in the module begins on the downstream side of the air/water separator or other device as required depending on the orientation of the module, and continues to the second end of the reaction chamber and overall module; wherein the second reaction chamber comprises an interior area, a gas inlet at or near a first end of the chamber; an inlet for introducing a compound(s) with ability to convert $NO_2$ into salts or other compounds while avoiding reactions with organic compounds in the gas stream. The compound(s) are introduced as a spray to the second reaction chamber at a point near the first opening, wherein the reaction chamber is equipped with one or more turbulence inducing devices downstream of the inlet for compounds and are configured for inducing turbulence, wherein the turbulence inducing device is a stationary device, and wherein the exhaust gas or gas to be treated is mixed with chemical(s) and allowed sufficient residence time to react with the $NO_2$ before the gas leaves the second reaction chamber through an opening at or near the other end.

Another contemplated marine NOx, SOx, organic compounds, particulates, particulate matter and combinations thereof treatment module can be combined with a SOx pretreatment module, such as those already disclosed, creating a two-module scrubbing system for marine vessel flue gas that comprises: a contemplated SOx pretreatment module wherein the second end of the SOx reaction chamber described above is coupled with a first end or an inlet end of a NOx, SOx, organic compounds, particulates, particulate matter and combinations thereof treatment module.

Yet another contemplated embodiment of the NOx, SOx, organic compounds, particulates, particulate matter and combinations thereof treatment module is used on gasses that are generated by combustion of fuels with 3 or less carbon chains or other sources that are devoid or organic residue in percent concentrations. This process utilizes the same hardware configuration described above; only the chemistry in the second chamber is different.

One process chemistry available in the second reaction chamber is the introduction of seawater, potable water or wastewater with or without additional metal hydroxides, as spray, mist or bubbled liquid layer in order to neutralize the mineral acids that are produced reaction chamber. The second chamber also includes a drain for discharge of water introduced into the chamber.

A second process chemistry is available in the second reaction chamber, wherein chemicals that react with the NOx, SOx, organic compounds, particulates, particulate matter and combinations thereof reaction byproducts are introduced into the system to produce commercially viable compounds. The variations of this option are described in detail later.

In some embodiments, a high temperature particulate and organic compound treatment module or system is disclosed that comprises two variations of an apparatus or system for removing particulate and/or organic compounds or a combination of both molecules from marine vessel exhaust or flue gas, or gas at temperatures above 65° C. from another source. In one variation, the apparatus includes: a reaction chamber, comprising an interior area, a gas inlet at or near a first end of the chamber, and a gas outlet at or near a second end of the chamber; an inlet for introducing $(ClO_2)^0$ suspended in liquid, into the reaction chamber, wherein the reaction chamber is equipped with one or more adsorbers or other surfaces to capture agglomerated organic compounds or soot, in some embodiments, and wherein the exhaust gas or gas to be treated is mixed with refrigerated aerosol containing suspended $(ClO_2)^0$. The refrigerated aerosol is introduced into the exhaust gas mixture through a lance that maintains the suspended $(ClO_2)^0$ liquid below 32° C. until it is release in mean droplet diameters calculated to maintain greater than 40% of their mass despite losses to evaporation in time of flight between the nozzle and the adsorber plate within the reaction chamber.

In another contemplated embodiment, the apparatus includes: a reaction chamber, comprising an interior area, a gas inlet at or near a first end of the chamber, and a gas outlet at or near a second end of the chamber; an inlet for introducing $(ClO_2)^0$ suspended in liquid wherein the exhaust gas or gas to be treated is mixed with refrigerated liquid with suspended $(ClO_2)^0$ is introduced into the exhaust gas mixture through a lance that maintains the suspended $(ClO_2)^0$ liquid below 32° C. until it is released in mean droplet designed to evaporate within the volume of the reaction chamber.

The design and placement of the wand that introduces the $(ClO_2)^0$ into the reaction chamber is important, and in some instances and embodiments critical, to the effective application of both variations of this the technology. The process control provided with this module senses exhaust gas temperature and velocity then regulates the pressure and temperature of the $(ClO_2)^0$ introduced into the reaction chamber to treat organic compounds and particulate through nozzles of specific orifice and configuration in a way that delivers liquid droplets of the precise diameter and temperature necessary to traverse the distance between the nozzle and the adsorber surface before the $(ClO_2)^0$ reaches a decomposition temperature.

In some embodiments, a low temperature particulate and organic compound treatment module or system is disclosed that comprises two variations of an apparatus or system for removing particulate and or organic compounds or a combination of both molecules from marine vessel exhaust or flue gas, or gas at temperatures below 65° C. from another source is disclosed. In one variation the apparatus includes: a reaction chamber, comprising an interior area, a gas inlet at or near a first end of the chamber, and a gas outlet at or near a second end of the chamber; an inlet for introducing $(ClO_2)^0$ suspended in liquid, into the reaction chamber wherein the $(ClO_2)^0$ suspended in liquid is sprayed through a wand that creates an aerosol within the exhaust gas stream. The reaction chamber has sufficient volume to allow complete evaporation of the aerosol droplets.

There are several contemplated post-treatment processes, methods, and systems that are disclosed herein and that are activated or undertaken in the post-treatment reaction chamber or post-treatment modules, which includes, but is not limited to, an acid neutralization post-treatment process, a sodium nitrate/nitrate production post-treatment process, an ammonium sulfate production post-treatment process, and/or an ammonium nitrate and ammonium chloride production post-treatment process.

A contemplated acid neutralization post-treatment process neutralizes acids made in the SOx pretreatment and NOx, SOx, organic compounds, particulates, particulate matter and combinations thereof treatment processes by combining them with seawater, pure water, potable water, or brackish waters, sometimes in combination with additional metal hydroxides, to neutralize the mineral acids by converting them into salts. The use of seawater has advantages over other waters in this application because of the inherent pH buffering associated with this particular liquid. In some cases, the use of seawater alone is sufficient to neutralize the mineral acids generated in the SOx pretreatment and NOx, SOx, organic compounds, particulates, particulate matter and combinations thereof treatment processes. The neutralization reactions may occur according to the following equations:

$$HCl+NaOH\rightarrow NaCl+H_2O \quad [6]$$

$$HNO_3+NaOH\rightarrow NaNO_3+H_2O \quad [7]$$

$$H_2SO_4+NaOH\rightarrow Na_2SO_4+2H_2O \quad [8]$$

It should be understood that the post-treatment process can occur in a reaction chamber affixed or coupled to the effluent, second, or outlet end of the NOx, SOx, organic compounds, particulates, particulate matter and combinations thereof treatment chamber/module, wherein the exhaust gas or gas to be treated leaving the second end of the chamber used for NOx, SOx, organic compounds, particulates, particulate matter and combinations thereof abatement immediately enters the first opening at or near the beginning of the chamber used for post-treatment.

The post-treatment process chamber can also be a completely independent vessel. In this embodiment, there is a connection of the second opening of the NOx, SOx, organic compounds, particulates, particulate matter and combinations thereof process chamber/module with an opening at or near the first end of the post-treatment module. In some contemplated embodiments, the exhaust gas or gas to be treated can be pulled through the post treatment chamber or series of chambers by a lower pressure at the discharge end of the post-treatment chamber(s) than at the inlet end of the post treatment chamber(s). This process of using differential pressures also aids in moving exhaust gas or gas to be treated through the pre-treatment phase, through the treatment phase, and also through the post-treatment phase, as disclosed herein.

The post-treatment chamber or module also includes one or more tubes or lines for the introduction of water having a pH adjustment by the addition of alkaline material or any other suitable chemical or chemicals that may be required or desirable to bring about a desired or necessary reaction. This water is used for production of a blanket of low diameter droplets that covers, in some embodiments, a majority of the surface, and in some instances, the full interior surface, of the reaction chamber by a nozzle or nozzles.

In other embodiments, most or all of the gas/exhaust that is passing through the reaction chamber or module is exposed or comes into contact with at least one layer of mist generated by a nozzle or nozzles. It should be understood that there may be cases where a small portion of the interior is not "blanketed" by droplets, because of the type of nozzle used or the interior shape of the chamber. In those instances, the process will still function very well. This also applies to the pre-treatment and treatment stages. The chamber may also include one or more turbulence inducing devices, wherein the turbulence inducing device is a stationary device.

In another embodiment, the nitrogen from the NOx in the exhaust gas is converted into sodium nitrite/nitrate in a post-treatment process that occurs in a module or modules of the same basic design described for the acid neutralization post-treatment process. But they differ from one another in the chemistry or chemicals added to the chamber through the nozzle(s). This post-treatment process minimizes the nitrogen loading added to wastewater and maintains compliance with marine IMO and other regulatory compliance requirements for nitrogen compound discharge. Another advantage of using this embodiment is a savings in precursor chemicals necessary to generate $(ClO_2)^0$. This process only requires the NOx, SOx, organic compounds, particulates, particulate matter and combinations thereof process to convert enough NO into $NO_2$ (pursuant to equation 2) to generate a 50/50 ratio of $NO/NO_2$ in the exhaust gas stream rather than treating all of the NO and $NO_2$, according to equations 2 and 3. The 50/50 $NO/NO_2$ exhaust gas mix is introduced into the first end of post-treatment chamber, wherein sodium hydroxide or other metal hydroxides—plus a process promoter of specific type described in Table 1 in quantities of between 5 and 10% of the volume of metal hydroxide—are added.

The equation for this process is shown in Equation 9. The molecules associated with the placeholder (**) are shown in Table 1:

$$2NaOH+NO_2+NO+(**)\rightarrow 2NaNO_2+H_2O \quad [9]$$

TABLE 1

| ** REACTION PROMOTING COMPOUNDS | PERCENT REMOVAL EFFICIENCY |
|---|---|
| $H_2O_2$ | 85-90% |
| $O_3$ | 95% |
| NaClO | 90-95% |
| $Ca(ClO)_2$ | 95-100% |

Figure 14:
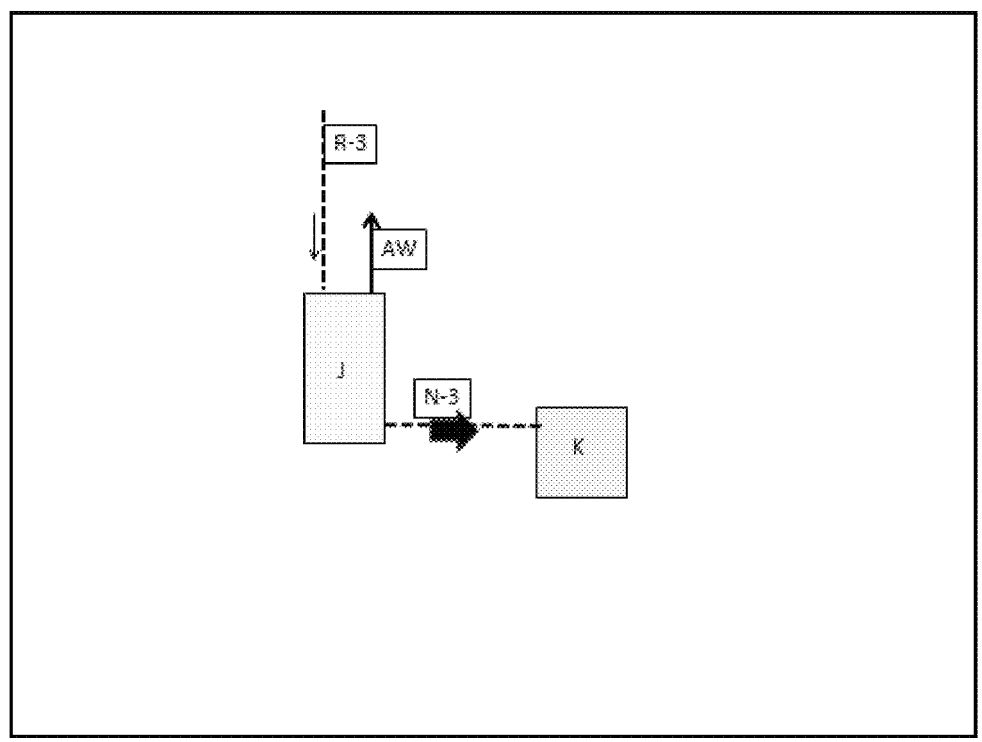
FIG. 14 shows contemplated separation/evaporation technology for nitrogen compound and commercially viable product separation from post scrubber processes.
Figure 15:
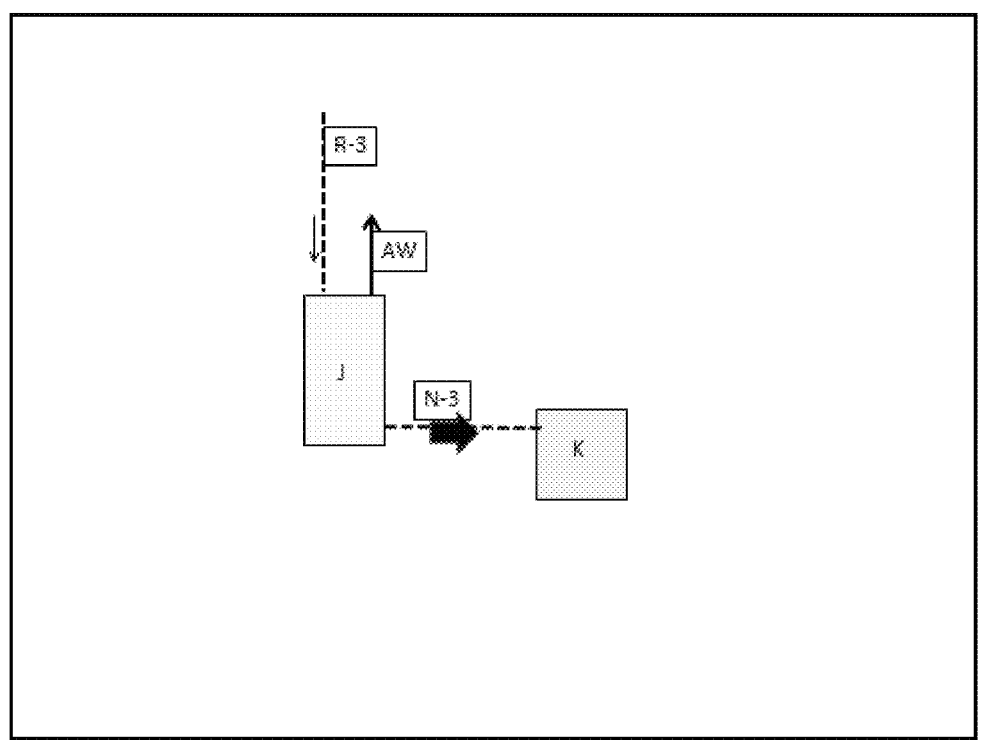
FIG. 15 show examples of contemplated nitrogen removal systems.

When some contemplated embodiments, the sodium nitrite/nitrate is captured from the wastewater through evaporation or precipitation as shown in FIG. 14 before the effluent is discharged into the sea or other body of water or liquid.

In yet another embodiment, ammonium sulfate production post-treatment process occurs in a module or modules of the same design described for the acid neutralization post-treatment process. But, they differ from one another in the chemistry or chemicals added to the chamber through the nozzle(s). This post-treatment requires the NOx, SOx, organic compounds, particulates, particulate matter and combinations thereof process to convert not less than half of the NO in the NOx exhaust gas stream into $NO_2$. The treated exhaust gas is introduced into the first end of post-treatment chamber, wherein ammonium sulfite is added through nozzles to react with the exhaust gas mixture, thereafter producing ammonium sulfate.

$$2NO_2+3(NH_4)_2SO_3\rightarrow 3(NH_4)_2SO_4+N_2+\tfrac{1}{2}O_2 \quad [10]$$

$$NO+NO_2+3(NH_4)_2SO_3\rightarrow 3(NH_4)_2SO_4+N_2 \quad [11]$$

In yet another embodiment, ammonium nitrate and ammonium chloride production post-treatment process occurs in a module or modules of the same design described for the acid neutralization post-treatment process. But, they differ from one another in the chemistry or chemicals added to the chamber through the nozzle(s). This post-treatment requires the NOx, SOx, organic compounds, particulates, particulate matter and combinations thereof process to convert not less than about 98% of the NO in the NOx exhaust gas stream into $NO_2$ in accordance with equation 2 and note less than about 98% of the $NO_2$ in the gas stream to $HNO_3$ and HCl in accordance with equation 3. The treated exhaust gas is introduced into the first end of post-treatment chamber, wherein ammonia is added through nozzles to react with the exhaust gas mixture, thereafter producing ammonium nitrate and ammonium chloride.

$$NH_3+HCl\rightarrow NH_4Cl \quad [12]$$

$$NH_3+HNO_3\rightarrow NH_4NO_3 \quad [13]$$

In yet another embodiment, $NO_2$ is removed from the exhaust gas stream when it reacts with any inorganic and organic sulfur-containing compounds, hydroxides, urea, amine compounds and derivatives thereof at high conversion efficiency into organic and inorganic containing sulfates, nitrates and other stable byproducts.

As part of this embodiment, it is important to remember equations 2 and 3:

$$5NO+2(ClO_2)^0+H_2O\rightarrow 5NO_2+2HCl \quad [2]$$

$$5NO_2+(ClO_2)^0+3H_2O\rightarrow 5HNO_3+HCl \quad [3]$$

When the fuel exhaust comes from diesel fuel and/or those fuels with four or more carbon atoms in a chain, the $(ClO_2)^0$ reacts with any organic compounds in the exhaust. Those reactions may take precedence over the reaction shown in equation 3. This competition between organic compounds and $NO_2$ for $(ClO_2)^0$ means that $NO_2$ is not converted at the levels seen when there is no organic compound contamination. There are some components that can be added during the process that will mitigate this effect, including the before-mentioned inorganic and organic sulfur-containing compounds, hydroxides, urea, amine compounds and derivatives thereof The addition of a sulfur-based compound or group of compounds to this particular contaminated gas stream will allow the $(ClO_2)^0$ to convert NO to $NO_2$ and leave the additional sulfur-based compound or compounds to cover $NO_2$ to salts for at or near 100% efficiency.

The ballast water treatment process is independent of the exhaust gas treatment in most embodiments, other than the fact that the NOx, SOx, organic compounds, particulates, particulate matter and combinations thereof treatment and the ballast water treatment systems both utilize gas phase chlorine dioxide that can be generated in one location.

Figure 2:
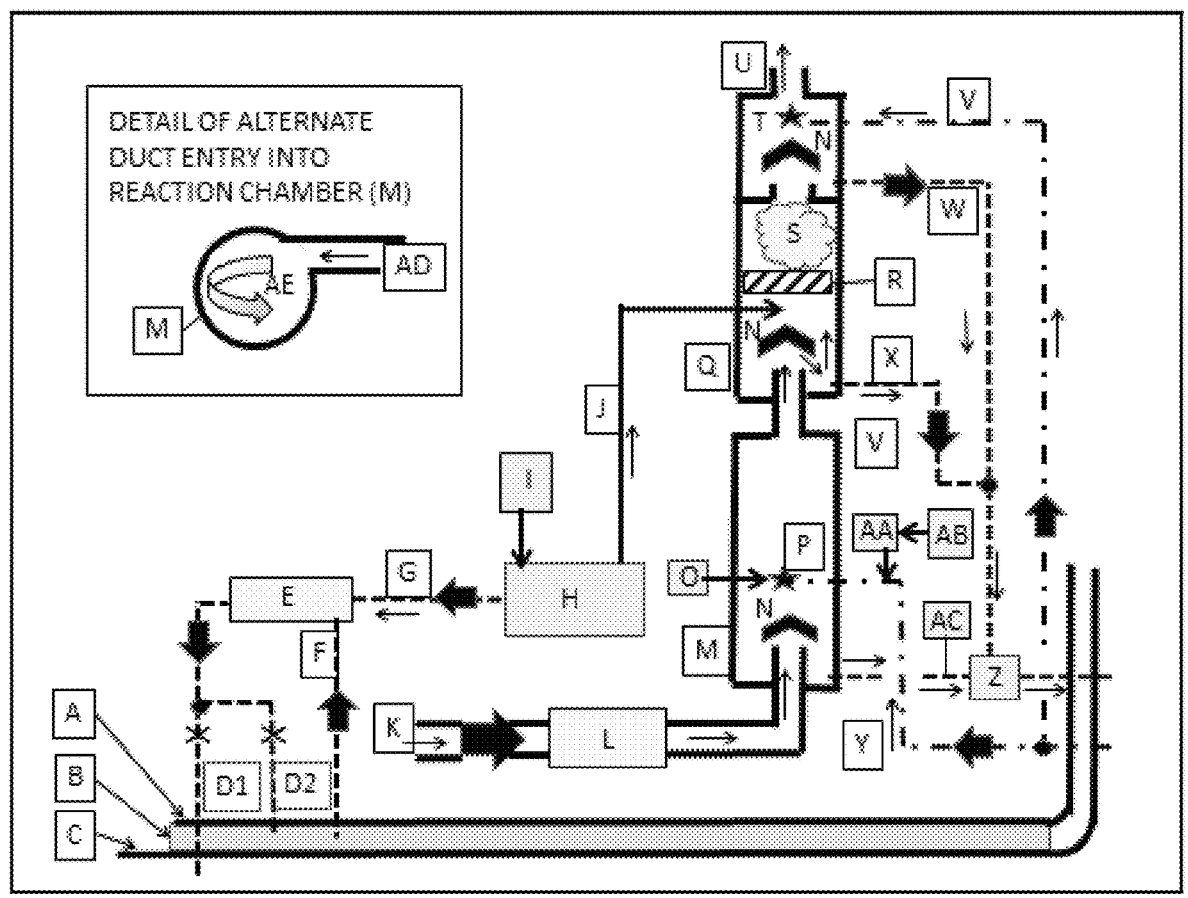
FIG. 2 shows an example of a contemplated process consisting of three modules: exhaust gas SOx pre-treatment in one module, exhaust gas NOx, SOx, organic compounds, particulates, particulate matter and combinations thereof treatment and post gas treatment in a separate module and ballast water treatment in a third module.

In some embodiments, as shown in FIG. 2, contemplated apparatus and methods can treat ballast water and return it to storage within the vessel or send the treated water back to the sea. A contemplated system can be sized to treat the seawater as it is leaving the ship without prior treatment, while the seawater is aboard or treat the seawater that is within the ship. Additional treatment can be added to the seawater as it leaves the ship.

Recognition of the novelty of the solutions described herein where the applications utilize the same chemical—chlorine dioxide—is facilitated by an understanding of this molecules chemical characteristic. It is also important to note that the term "chlorine dioxide" has been misapplied in patent and non-patent literature. The name is assigned to one of three ionic variations of the $ClO_2$ molecule.

Chlorine dioxide is capable of existing in three ionic states. Table 1 provides the IUPAC names for them and describes their ionic characteristics. Again, this distinction is made because the ionic form of this $ClO_2$ molecule has mistakenly been called "chlorine dioxide" and that ionic form of $ClO_2$ will not achieve the results described herein because that molecule has dramatically different chemical characteristics than the non-ionic form of $ClO_2$ or as referred to herein, $(ClO_2)^0$.

TABLE 2

| Preferred IUPAC Name | Ionic charge | Conventional Formula | Formula used in the present disclosure |
|---|---|---|---|
| Chlorine dioxide | 0 | $ClO_2$ | $(ClO_2)^0$ |
| Chlorite | −1 | $ClO_2^-$ | $(ClO_2)^-$ |
| Chloryl | +1 | $ClO_2^+$ | $(ClO_2)^+$ |

The $(ClO_2)^0$ is the molecule responsible for chemical reactions with NOx, $SO_2$ and $SO_x$, OC's and ballast water treatments for marine vessels described herein.

The success in gas phase abatement of $NO_x$, $SO_x$ and ballast water decontamination is only possible when the non-ionic version of the $ClO_2$ molecule is utilized. The technology disclosed herein is exclusively related to the non-ionic form of the $(ClO_2)^0$ molecule; however, other forms of the $ClO_2$ molecule and other compounds may be present during chemical reactions described herein—either because of side reactions or because they are being utilized for other purposes.

Contemplated embodiments can eradicate most planktonic and bacterial organisms from seawater used as ballast in vessels. This technology utilizes $(ClO_2)^0$ suspended in water that is made on an as needed basis aboard the vessel. The $(ClO_2)^0$ is a selective biocide that is applied more often in industry and municipal water treatment applications, because of the fact that is has less damaging effects to the environment and human health than chlorine. It does not form hydrochlorous acids in water; it is also a more reactive biocide at seawater pH ranges. Automated control and sensor systems for the ballast water treatment system are a part of the contemplated systems. These control and sensor systems provide the crew with the ability to determine the concentration of chlorine dioxide desired in the ballast water and verify that the desired concentration is present.

It is contemplated that in some embodiments, the ballast water treatment system uses the same chlorine dioxide generator system as the NOx, SOx, organic compounds, and particulate matter abatement systems, which means that this entire system can be compact and efficient.

A ballast water treatment system for producing treated seawater is described herein that includes: a reaction chamber, wherein the reaction chamber is located within a vessel; an inlet for introducing chlorine dioxide into the reaction chamber, wherein the reaction chamber is equipped with one or more turbulence inducing devices configured for inducing turbulence, wherein the turbulence inducing device is a stationary device; a second inlet for the introduction of seawater, into the reaction chamber; and an outlet from the reaction chamber, wherein the treated seawater is returned to a storage facility within the vessel or is returned to the sea. As with the other systems disclosed herein, at least one additional treatment component can be provided into the system, such as at least one alkaline material, at least one pH adjustment component, or other components, as needed.

Also, as with other systems disclosed herein, contemplated ballast seawater systems may comprise an automated control and sensor system. These control and sensor systems are designed to monitor and control the concentration of chlorine dioxide, at least one additional treatment component, or a combination thereof. In some embodiments, a contemplated control and sensor system is operatively coupled with an infrared detector. In these embodiments, a contemplated infrared detector is utilized to measure the chlorine dioxide concentration in the reaction chamber.

In some embodiments, the automated control and sensor system measures the pH of the seawater. In some embodiments, this same system can measure and adjust the pH of the seawater. The pH of the seawater may be measured and adjusted when the seawater is in the reaction chamber. In other embodiments, the pH of the seawater may be measured and adjusted after the seawater exits the reaction chamber.

A method of treating ballast seawater for producing treated seawater is also described that includes: providing a reaction chamber, wherein the reaction chamber is located within a vessel; providing an inlet for introducing chlorine dioxide into the reaction chamber, wherein the reaction chamber is equipped with one or more turbulence inducing devices configured for inducing turbulence, wherein the turbulence inducing device is a stationary device; providing a second inlet for the introduction of seawater, into the reaction chamber; providing an outlet from the reaction chamber; and treating the seawater with chlorine dioxide, wherein the treated seawater is returned to a storage facility within the vessel or is returned to the sea.

In summary, contemplated embodiments provide several advantages in marine applications over other available and conventional technologies for exhaust gas treatment, wherein the exhaust gas may include NOx, SOx, organic compounds, particulate matter, or a combination thereof; and ballast water treatment, including: a) saving space and cost, because contemplated embodiments utilize the same chemical generation equipment for the core aspects of all seven processes; b) contemplated embodiments provide 100% backup for NOx, SOx, organic compounds, particulate matter, or a combination thereof abatement when integrated with SCR or other NOx abatement technology, wherein contemplated embodiments provide this backup with only a fraction of the space or cost required for any other 100% backup technologies; c) contemplated embodiments are very adaptable, in that they can operate as a stand-alone system or as an integrated package with other abatement technologies, embodiments can be separated into autonomous separate modules when just one or more of the contemplated systems are required for a specific project requirement; and d) contemplated embodiments will continually meet future emission compliance requirements without an equipment upgrade.

As an example, contemplated integrated NOx, SOx, organic compounds, particulates, particulate matter and combinations thereof reactor and generator modules can be provided alone to solve compliance challenges for a vessel with under-performing abatement equipment, when the vessel is required to meet more stringent international IMO or national emission requirements for NOx and $SO_2$. Furthermore, the nitrogen reducing module embodiment can be added if required to meet nitrogen emissions.

In other embodiments, contemplated abatement systems are capable of meeting changing NOx, SOx, organic compounds, particulates, particulate matter and combinations thereof removal efficiency requirements by merely revising a removal efficiency set-point. The initially supplied reaction vessel and generator are adaptable and cost effective, because they only generate $(ClO_2)^0$ on an as needed basis. This "as needed" feature eliminates ongoing wasted chemical costs and the extra upfront equipment cost associated with the purchase of extra capacity in a conventional scrubber.

The following Examples illustrate how the embodiments disclosed herein can be utilized; however, it should be understood that these Examples are not limiting and are used to show some of the specific embodiments that are a part of the broad scope of the technology disclosed herein.

EXAMPLES

Example 1

A NOx, SOx, or a combination thereof abatement or scrubbing process (NOx, SOx, organic compounds, particulates, particulate matter and combinations thereof process) for marine vessel flue gas, can be accomplished in a single-chambered module as described generally earlier. A contemplated process is included in this example.

Exhaust gas is drawn into the first end of the NOx, SOx, organic compounds, particulates, particulate matter and combinations thereof reaction chamber and continues to move through the chamber to the second end of the chamber. The $(ClO_2)^0$ as gas, mist, or droplets is drawn or pushed into a contemplated NOx, SOx, organic compounds, particulates, particulate matter and combinations thereof reaction chamber at a point downstream of the first end of the chamber. The exhaust gas and $(ClO_2)^0$ are drawn into and through the reaction chamber by the lower exhaust gas pressure at the second end of the chamber, as compared to the first end of the chamber.

In embodiments that introduce $(ClO_2)^0$ as a gas, there is no need to push the gas into the reaction chamber. It is safer to allow it to be pulled into the chamber by the differential pressure between the inside of the reaction chamber and the ambient pressure in which the gas is stripped from liquid during preparation for this application. In embodiments that introduce $(ClO_2)^0$ that has been suspended in a liquid into the reaction chamber, a low pressure pump can provided to facilitate moving the liquid into the chamber.

Downstream of the point $(ClO_2)^0$ is introduced into the reaction chamber, the $(ClO_2)^0$ and exhaust gas are pulled through a static mixer or mixers of any conventional design. When gas phase $(ClO_2)^0$ is introduced into the reaction chamber, the static mixers can be placed immediately downstream of the point where the $(ClO_2)^0$ is added. In some embodiments when $(ClO_2)^0$ is introduced into the reaction chamber as a mist or droplets, the static mixers are place sufficiently downstream of the point where the $(ClO_2)^0$ is introduced to allow the mist or droplets to evaporate. The mixed gases continue down the length of the reaction chamber while the NOx and SO$_2$ abatement reactions described in equations [2], [3] and [4] occur.

$$5NO+2(ClO_2)^0+H_2O \rightarrow 5NO_2+2HCl \qquad [2]$$

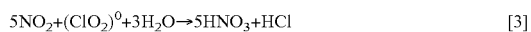

$$5NO_2+(ClO_2)^0+3H_2O \rightarrow 5HNO_3+HCl \qquad [3]$$

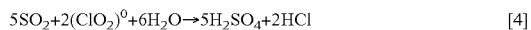

$$5SO_2+2(ClO_2)^0+6H_2O \rightarrow 5H_2SO_4+2HCl \qquad [4]$$

In some embodiments, NOx, SOx, organic compounds, particulates, particulate matter and combinations thereof abatement process occurs in a module with two chambers. In this two-chambered module embodiment, the NOx, SOx, organic compounds, particulates, particulate matter and combinations thereof abatement occurs in the first of two chambers to receive exhaust gas. The second chamber within the module conditions the exhaust gas after NOx, SOx, organic compounds, particulates, particulate matter and combinations thereof scrubbing.

Treated exhaust gas is drawn through both chambers from the first opening at near one end of the first chamber to the other end of the first chamber and through an opening at or near the other end of the first chamber wherein the exhaust gas and entrained chemicals are pulled into the first end of the second chamber through an opening, then pulled through the chamber to the other end of the second chamber where the exhaust gas and entrained chemicals leave the second chamber through an opening.

The exhaust gas and entrained chemicals are pulled into and through both chambers by a differential pressure between the first end of the first chamber and the second end of the second chamber. $(ClO_2)^0$ gas is drawn into the contemplated and disclosed NOx, SOx, organic compounds, particulates, particulate matter and combinations thereof reaction chamber through a duct or pipe at a point that is downstream of the first end of the first chamber. In some embodiments the pipe is configured in a pattern that facilitates uniform distribution of the $(ClO_2)^0$ gas across the surface of the reaction chamber. $(ClO_2)^0$ laden gas is pulled through holes in the pipe that is configured into a pattern within the reaction chamber. Immediately downstream of the point $(ClO_2)^0$ is introduced into the reaction chamber, the $(ClO_2)^0$ and exhaust gas are mixed by being pulled through a static mixer or mixers of any conventional design. After mixing, the gases continue to be drawn down the length of the reaction chamber while the NOx and SO$_2$ abatement reactions described in equations [2], [3] and [4] occur.

Example 2

FIG. 1 shows an example of a contemplated process integrated with a NOx SCR scrubber (1-C). The integrated technology package provides a very cost effective way to exceed IMO's 2020 requirements for NOx and SO$_2$ emissions. The SCR (1-C) cost effectively removes up to 98% of the NOx. The contemplated seawater scrubber (1-I) removes up to 93% of the SOx and a contemplated NOx/SOx scrubber (1-J) completes the NOx and SOx removal to greater than 99.5%. A contemplated NOx, SOx, organic compounds, particulates, particulate matter and combinations thereof system (1-J) is also capable of treating all of the NOx, SOx, organic compounds, particulates, particulate matter and combinations thereof in the event the SCR or seawater scrubber are nonoperational. A contemplated ballast water treatment system (1-P) also meets IMO ballast water treatment requirements with $(ClO_2)^0$ dosing.

In FIG. 1, the exhaust gas flows through ducting represented by solid black lines. Arrows indicate the direction of gas flow. The combustion source exhaust is treated in the NOx SCR scrubber (1-C) first because this process requires high gas temperatures. With a majority of the NOx removed, the hot exhaust gas is cooled in a heat exchanger (1-F). The heat is transferred from the exhaust gas into water or another gas. This hot water can be used for many applications including reheating the exhaust gas after the final scrubbing stage if there is a desire to reduce the white plume associated with the clean moist exhaust gas.

The majority of the SOx is removed from the cooled exhaust gas in the contemplated seawater pre-scrubber (1-I). It should be understood that this example utilizes seawater, but other types of water can be utilized, as disclosed earlier. This particular seawater SOx scrubber, which includes effectively scrubbing SO$_2$, can be the technology associated with the contemplated process or the technology from another source. Once the majority of the SOx is removed the cool exhaust gas enters the contemplated NOx, SOx, organic compounds, particulates, particulate matter and combinations thereof reaction chamber (1-J). This scrubbing stage removes in excess of 99.5% of the remaining SOx and NOx in the gas stream. A contemplated process makes automatic performance adjustments based on data it receives from analytical sensors (1-R) (and others not shown) monitoring the treated exhaust gas stream and other variables. See FIG. 6 for additional details on the control system.

This contemplated feature when combined with the pre-treatment modules for NOx (1-C) and pre-treatment module for SOx (1-I) provides 100% backup capability for the integrated system. An exhaust fan (1-Q) provides the motive force necessary to overcome any static pressure generated in the scrubbing sequence or exhaust muffler (1-S).

Ballast water is treated to meet ISO compliance using module (1-P). The ballast water flows in and out of the treatment systems as shown with arrows (1-U) and (1-V). Additional descriptions for FIG. 1 is shown in Table 3.

TABLE 3

KEY EXPLANATION

| | |
|---|---|
| A | Fresh air intake to the combustion device (engine, boiler etc.) |
| B | Combustion device (engine, boiler etc.) |
| C | Selective Catalytic Reduction scrubber (SCR) for NOx |
| D | SCR dosing and control unit for urea injection |
| E | Urea $((NH_2)_2CO)$ storage tank |
| F | Heat exchanger |
| G | Cold water/gas inlet |
| H | Hot water/gas outlet |
| I | Seawater scrubber (spray if supplied by a contemplated embodiment or packed bed if by another vendor) |
| J | Contemplated SOx and NOx scrubber with gas polisher |
| K | Seawater conditioning equipment (remove particulate and adjust pH) |
| L | Return seawater to ocean |
| M | Fresh seawater inlet |
| N | Contemplated $(ClO_2)°$ generator and dosing equipment (both gas phase $ClO_2$ for NOx and SOx and aqueous phase $ClO_2$ for ballast water dosing) |
| O | Chemicals used by $(ClO_2)°$ generator (varies by manufacturer). |
| P | Ballast water treatment module using aqueous $(ClO_2)°$ delivered from (N) |
| Q | Exhaust blower with optional damper assembly |
| R | Gas analyzer for NOx, SOx and $(ClO_2)°$ (data used to regulate contemplated and other scrubbing systems. |
| S | Silencer |
| T | Clean exhaust retuned to the atmosphere |

TABLE 3-continued

KEY EXPLANATION

| | |
|---|---|
| U | Treated seawater - See FIG. 3 for detail |
| V | Untreated seawater - See FIG. 3 for detail |

Example 3

FIG. 2 shows an example of a combination of three contemplated process (SOx pre-scrubber module, NOx, SOx, organic compounds, particulates, particulate matter and combinations thereof module and ballast water treatment module) in a standalone operating mode. This is configuration does not include an SCR scrubber and therefore has a dramatically lower equipment cost. This standalone configuration is cost effective for large vessels with intermittent use and yachts. FIG. 2 provides more detail on this contemplated exhaust gas treatment process by revealing the internal components of the contemplated NOx, SOx, organic compounds, particulates, particulate matter and combinations thereof reactor (2-Q) and the proprietary and contemplated seawater pre-treatment scrubber reaction chamber (2-M). The reaction chambers are depicted as cylindrical, but the patent includes other vessel shapes. The reaction chamber is depicted as being vertical, but it functions in any orientation when the alternative tangential side entry (2-AD) shown in FIG. 2 is used. A key for FIG. 2 is found in Table 4.

TABLE 4

KEY EXPLANATION

| | |
|---|---|
| A | Vessel inner hull or tankage partition |
| B | Ballast water |
| C | Vessel outer hull |
| D1 | Treated ballast water is pumped back into the sea |
| D2 | Treated ballast water is pumped back into holding tank |
| E | Ballast water treatment device that utilizes $ClO_2$ as the disinfectant |
| F | Ballast water pumped into the ballast water treatment device |
| G | $(ClO_2)°$ suspended in water is pumped from the $(ClO_2)°$ generator to the ballast water treatment device |
| H | $(ClO_2)°$ generator. There are many options and this patent can utilize any that deliver the $(ClO_2)°$ without unreacted chemicals or undesirable byproducts. |
| I | Chemical storage tanks for the $(ClO_2)°$ generator. Chemical requirement vary by process |
| J | $(ClO_2)°$ in gas phase mixed with air or other gas is pulled into the contemplated reaction chamber by differential pressure |
| K | Hot exhaust gas from a combustion source or an SCR NOx scrubber |
| L | Heat exchanger. The process can transfer heat into gas or liquid for use elsewhere |
| M | Contemplated SOx scrubbing vessel |
| N | Generic air water separator |
| O | Device for pressurizing and regulating the flow of gas or liquid into the nozzles (P). Source for pressurized gas or fluid not shown |
| P | Nozzles integrating seawater with high pressure gas and/or liquid to produce liquid droplets with high surface area |
| Q | Contemplated reaction vessel for NOx, SOx, organic compounds, particulates, particulate matter and combinations thereof abatement |
| R | Generic static mixer |
| S | Mist cloud of $(ClO_2)°$ and NOx, SOx, organic compounds, particulates, particulate matter and combinations thereof in gas phase - with or without colloidal liquid droplets |
| T | Nozzle with or without gas/hydraulic atomization |
| U | Exhaust gas with exceptionally low levels of SOx and NOx |
| V | Seawater pumped into the contemplated scrubber exhaust gas polishing step |
| W | Wastewater pumped to the seawater reclamation device (Z) |
| X | Drain for condensate accumulated in the contemplated reaction chamber (Q) |
| Y | Seawater pumped into the contemplated SOx scrubber (M) |
| Z | Seawater reclamation device that removes particulate and adjusts pH |
| AA | Automated chemical metering device for caustic solution such as NaOH |
| AB | Tank for caustic solution |
| AC | pH probe connected via contemplated sensor and control array (not shown) to chemical metering pump (AA) for addition of caustic material (AA) as required to maintain pH set point |

TABLE 4-continued

KEY EXPLANATION

AD  Duct tangentially entering an end of the contemplated SOx reaction vessel (M)
AE  Image indicating the swirl introduced into the exhaust gas by (AD)

As shown in FIG. 2, the exhaust gas flows between the double solid black lines. The double lines represent ducting. The diagram begins where exhaust gas is ready to enter the heat exchanger (2-L). For clarity, the heat exchanger's cold/hot liquid or gas flow is omitted. The cooled exhaust gas then travels to the seawater pre-scrubber reaction chamber (2-M) where the majority of the SOx is removed. This diagram depicts the unique features claimed in this patent for a seawater scrubber. The process design also applies to potable water, pure water and brackish water.

The exhaust gas enters seawater SOx pre-treatment scrubber vessel bottom (2-M) or it tangentially enters the vessel side wall (See insert in Figure #2) that shows a detail of the alternate reaction chamber (2-M) gas inlet. In either case the gas is pulled upward by an exhaust gas fan (not shown) on the suction side of the scrubber train. As the gas move toward the center of the reaction chamber (2-M) it mixes with fine mist from gas atomizing and/or hydraulically atomizing nozzles (2-P). The nozzles are oriented in a way that produces multiple layers of fine mist covering the entire diameter of the reaction vessel. The exhaust gas stream is mixed with small diameter and high surface area water droplets. The high surface area of the small droplets improves SOx removal efficiency by enhancing mass transfer between the exhaust gas and liquid seawater, or other waters. This allows the contemplated seawater SOx scrubber to be physically smaller than conventional seawater scrubbers. When exhaust gas enters the reaction vessel tangentially as shown in the detail of FIG. 2, exhaust gas swirls around the circumference of the reaction vessel as it progresses from one end of the vessel to the other. This swirling action increases SOx removal efficiency by increasing gas/liquid mixing. Another attribute of the tangential gas entry is the freedom to orient the reaction vessel in any direction.

A contemplated seawater SOx pre-treatment scrubber is relatively light. There is no water or packing weight so it can be supported with minimal structural support. The small size and light weight and ability to be oriented in any direction reduce retrofit costs and challenges.

Another contemplated seawater SOx pre-treatment scrubber attribute is its automated monitoring of the seawater pH (2-AC) and the addition of an alkaline compound such as NaOH (2-O) to the seawater when the vessel is traveling through an ocean that has lower than normal pH. Contemplated processes and control centers (not shown) monitor and regulate pH and many other variables required to provide safety and optimized SOx removal efficiency.

FIG. 2 shows a contemplated seawater SOx pre-treatment scrubber (2-M) as cylindrical but this is only an example. There is no limitation to or on vessel geometry.

After the majority of the SOx is removed in the seawater pre-treatment scrubber (2-M), the exhaust gas enters one end of the contemplated NOx, SOx, organic compounds, particulates, particulate matter and combinations thereof scrubber vessel (2-Q). This vessel and the supporting $(ClO_2)^0$ generator (1-N)(2-H) are uniquely designed to cost effectively treat just remaining NOx, SOx, organic compounds, particulates, particulate matter and combinations thereof not treated in the preceding SCR NOx scrubber (1-C) and seawater pre-scrubber (1-I) (2-M) or it can handle the entire load from either of them in the event there is an equipment failure. FIGS. 1 and 2 depicts this NOx, SOx, organic compounds, particulates, particulate matter and combinations thereof vessel (1-J)(2-Q) in a vertical orientation, but in practice it and the SOx pre-scrubber (1-I)(2-M) can be oriented in any direction. There is no need for the air-water separators (2-N) at the entrance end of the contemplated reaction vessels (2-M) and (2-Q) when the vessel is oriented in any direction other than vertical as shown in FIGS. 1 and 2.

As mentioned earlier, a contemplated NOx, SOx, organic compounds, particulates, particulate matter and combinations thereof scrubber is relatively light. Once again there is no water or packing or catalyst weight so it can be supported with minimal structural support. The vessel is also smaller in size than an SCR or packed bed scrubber designed to treat a comparable gas flow and contaminant NOx load. Furthermore, a contemplated NOx, SOx, organic compounds, particulates, particulate matter and combinations thereof scrubber's light weight and ability to be oriented in any direction reduces retrofit costs and challenges.

Figure 5:
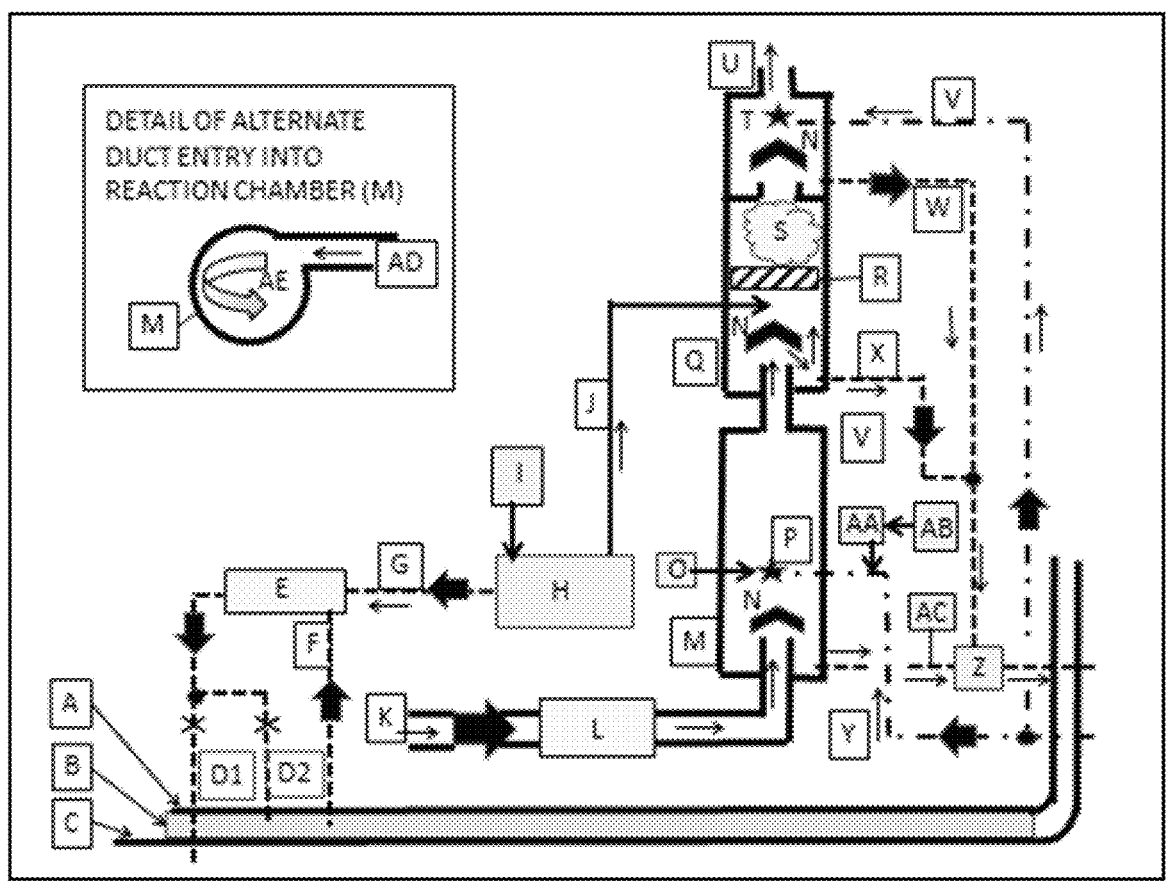
FIG. 5 shows an example of the contemplated process consisting of three modules: exhaust gas SOx pre-treatment is in one module, NOx, SOx, organic compounds, particulates, particulate matter and combinations thereof scrubbing and post scrubbing gas treatment are combined in a second module, and ballast water treatment in a third module. All modules share the same chemical generation system.

The exhaust gas is drawn into a contemplated NOx, SOx, organic compounds, particulates, particulate matter and combinations thereof treatment reaction vessel by an exhaust fan (not shown). The entire vessel and all other vessels and ducts that are a part of the scrubber train are maintained at a net negative pressure when compared to the ambient atmospheric pressure, which provides several advantages. First, it prevents any partially treated exhaust gas from leaking out of the treatment train. Second, it provides process safety by pulling the $(ClO_2)^0$ from the generator (2-H) into the contemplated reaction vessel (2-M). Third, this provides process safety by eliminating backpressure on the combustion device. Contemplated instrumentation and process control array (not shown) maintains the scrubber train negative pressure (and other variables) despite pressure fluctuations caused by damper position changes in complicated scrubbing systems designed to treat exhaust gas from multiple combustion sources. A contemplated sensor and control array (not shown) includes differential pressure sensor(s) that provide data used to regulate the exhaust fan speed as required to maintain a negative pressure set point or trigger an alarm if the negative pressure cannot be maintained. A contemplated control system is shown in FIG. 5 and Table 7.

The $(ClO_2)^0$ gas is drawn into the contemplated and disclosed NOx, SOx, organic compounds, particulates, particulate matter and combinations thereof reaction chamber (2-Q) down stream of and near the point that the exhaust gas is introduced into the chamber (2-Q). Then immediately downstream of the point $(ClO_2)^0$ and exhaust gas are introduced the gases are pulled through a static mixer of any conventional design. After mixing, the gases continue down the length of the reaction chamber (2-Q) while the NOx and $SO_2$ abatement reactions described in equations [2], [3] and [4] occur.

$$5NO+2(ClO_2)^0+H_2O \rightarrow 5NO_2+2HCl \qquad [2]$$

$$5NO_2+(ClO_2)^0+3H_2O \rightarrow 5HNO_3+HCl \quad [3]$$

$$5SO_2+2(ClO_2)^0+6H_2O \rightarrow 5H_2SO_4+2HCl \quad [4]$$

$$6SO_3^{-2}+2(ClO_2)^0 12H^+ \rightarrow H_2S_2O_6+4H_2SO_4+2HCl \quad [5]$$

Laboratory and in-the-field studies have shown that the equations noted above have different rates of reaction and all three have equilibrium constants that strongly favor the right side of the equation. Equation [4] and [5] are faster than equation [2], and equation [2] is faster than equation [3]. These observations and other related studies lead to the recognition of the enormous application flexibility available in this contemplated technology package including but not limited to the production of commercially viable products from reaction effluents and strategic integration with other SOx and NOx abatement processes.

FIG. 1 shows the synergistic value of combining three or more technologies in a way that delivers economic and performance benefits that are greater than the sum of the benefits available from the individual technologies. The pre-treatment SCR technology removes the bulk of the NOx more cost effectively than the contemplated NOx, SOx, organic compounds, particulates, particulate matter and combinations thereof process but the SCR is unable to reach the removal efficiencies available through the use of contemplated NOx, SOx, organic compounds, particulates, particulate matter and combinations thereof processes and apparatus. Similarly, the pre-treatment seawater SOx scrubber removes these compounds at a lower operating cost but is unable to reach the high removal efficiency provided by the contemplated NOx, SOx, organic compounds, particulates, particulate matter and combinations thereof process. And as previously noted, the combined technologies provide the most cost effective 100% backup protection for the vessel or land-based industry. The combined technology also requires with far less space than other imaginable 100% redundant options.

A contemplated NOx, SOx, organic compounds, particulates, particulate matter and combinations thereof reaction chamber (2-Q) is smaller than any other technology for use for the disclosed purposes known at this time including SCR and wet scrubbing, because:

Contemplated NOx, SOx, organic compounds, particulates, particulate matter and combinations thereof reactions have the propensity to be gas phase reaction that only requires the $(ClO_2)^0$ to meet/contact the NOx molecule. It does not require a catalyst that is necessary in the SCR technology. The SCR technology requires a larger area and volume than contemplated NOx, SOx, organic compounds, particulates, particulate matter and combinations thereof processes, because the SCR reaction requires three molecules to meet at the same time and that is statistically and literally more difficult, because it requires more opportunities for a "meeting" than is necessary in the contemplated NOx, SOx, organic compounds, particulates, particulate matter and combinations thereof process. In the SCR process, a NOx molecule must simultaneously meet a urea or ammonia molecule at the same time it meets with the catalyst. This random act becomes more difficult as the concentration of NOx diminishes. This is overcome in the SCR process by providing several layers of catalyst. When high removal efficiencies are required there can be four or more layers each requiring space within the SCR reaction chamber.

Contemplated NOx, SOx, organic compounds, particulates, particulate matter and combinations thereof processes do not need the volume necessary to provide sufficient reaction time for slow liquid phase reactions to occur. Liquid phase/gas phase reaction of the type done in all wet scrubbing systems require more volume than the contemplated NOx, SOx, organic compounds, particulates, particulate matter and combinations thereof scrubber because wet scrubbers require time for the NOx molecules in the exhaust gas to penetrate the gas/liquid barrier. This is particularly important when treating NO (NOx from combustion is about 95% NO), because of NO's low solubility in water: 0.0098 g/100 ml at 0° C.

Contemplated NOx, SOx, organic compounds, particulates, particulate matter and combinations thereof processes are not poisoned or contaminated by sulfur products found in marine fuel. A contemplated NOx, SOx, organic compounds, particulates, particulate matter and combinations thereof process does not have any catalyst to become contaminated or packing to become clogged. This unwanted catalyst poisoning is described in greater detail later.

A contemplated NOx, SOx, organic compounds, particulates, particulate matter and combinations thereof process is not limited to the fast gas phase chemistry described above. Although slower, the $(ClO_2)^0$, as suspended in a liquid, can be introduced into the contemplated and disclosed reaction chamber (2-Q). When this done, the process requires a larger reaction chamber to accommodate the reaction time necessary to evaporate the droplets and/or undergo the gas/liquid mass transfer as described above. The gas phase reactions only necessitate a reaction vessel (2-Q) of sufficient volume to provide 0.5 second residence time. The reaction residence time is increased to as much as 1.5 seconds when $(ClO_2)^0$ is introduced into the reaction vessel (2-Q) as a liquid.

Once the exhaust gas and the $(ClO_2)^0$ have had sufficient time to react and reach a desired process equilibrium, the mixture is ready for a subsequent reaction to produce a commercially viable product from reaction byproducts or the reaction byproducts can be neutralized and discarded as waste that may require further treatment before it is disposed in a responsible way. In this marine application, the second portion of the NOx, SOx, organic compounds, particulates, particulate matter and combinations thereof treatment/reaction chamber (2-Q) is used to transfer the reaction products into seawater. The seawater or other water used as a medium to capture the NOx, SOx, organic compounds, particulates, particulate matter and combinations thereof reaction products may have additional metal hydroxide components or other alkaline components. If required, the wash liquid will receive subsequent neutralization or treatment before being returned to the sea. If space is available, the vessels could be fitted with a recycling program that produced a commercially viable compounds from the NOx, SOx, organic compounds, particulates, particulate matter and combinations thereof reaction products.

Returning to differences in the rates of reaction for equations [2], [3] and [4], when $SO_2$ is present in a NOx, SOx, organic compounds, particulates, particulate matter and combinations thereof exhaust gas mix, the $SO_2$ will always react first. Therefore, economic viability necessitates pre-treatment of $SO_2$ in the gas stream, when present in large quantities, with a pretreatment process that utilizes chemicals with lower cost than the chemicals used in the contemplated NOx, SOx, organic compounds, particulates, particulate matter and combinations thereof process and save the contemplated NOx, SOx, organic compounds, particulates, particulate matter and combinations thereof process for removal of the remaining NOx, SOx, organic compounds, particulates, particulate matter and combinations thereof that the precursor processes are unable to remove.

The fact that equation [2] is dramatically faster than equation [3] provides an opportunity for great flexibility in the application of contemplated processes, because it allows the $(ClO_2)^0$ mixed with the exhaust gas to selectively react with the NO portion of the NOx present until a desired ratio of $NO/NO_2$ is obtained. This is particularly applicable when contemplated methods and processes are treating NOx generated in a combustion process because that NOx typically contains 90-95% NO.

Additional research has demonstrated a 50/50 mixture of $NO/NO_2$ will react efficiently with NaOH when promoted by a sub-stoichiometric ratio of any of several compounds. The reaction of the 50/50 NOx mix is not less than 30% more efficient than a reaction between NaOH and a mixture with more NO than $NO_2$ that is not promoted with the sub-stoichiometric ratios of promoters described in Table 1.

Bench and pilot studies at ambient temperatures and slightly negative pressure (3" $H_2O$ column) provide the following results:

$$2NaOH + NO_2 + NO + (**) \rightarrow 2NaNO_2 + H_2O \quad [9]$$

The reaction promoters described in Table 1 were found to be effective at concentration between 5-10% (molar basis) of the total NaOH used in the reaction. There was no identified improvement in reaction rate or shift in the reaction equilibrium when higher concentrations of the promoters were added.

TABLE 1

| **REACTION PROMOTING COMPOUNDS | PERCENT REMOVAL EFFICIENCY |
|---|---|
| $H_2O_2$ | 85-90% |
| O3 | 95% |
| NaClO | 90-95% |
| $Ca(ClO)_2$ | 95-100% |

This two-step process reduces the overall operational cost of NOx abatement, because it only requires a minimal amount of $(ClO_2)^0$ necessary to create a 50/50 $NO/NO_2$ balance in the NOx ratio and primarily utilizes less expensive NaOH and reaction promoter to remove the NOx from the gas stream.

The secondary process depicted in FIG. 2, as an extended reaction chamber, utilizes seawater, or other types of water, as a solvent for contemplated NOx, SOx, organic compounds, particulates, particulate matter and combinations thereof reaction byproducts. This is an optimum solution for a seagoing vessel and land based facilities near the sea, but this is not the only option. As previously noted, the reaction products could be converted into commercially viable compounds if space and budget allowed. In this example, the HCl, $HNO_3$ and $H_2SO_4$ acids formed in equation [2], [3] and [4] are removed from the exhaust gas stream and partially neutralized by the seawater's alkalinity in an attached secondary mist treatment. Any additional neutralization occurs in the process water reclamation step (2-Z). The second portion of the contemplated reaction chamber (2-Q) contains an air water separator (2-N) when the chamber is mounted vertically. This is not required in horizontal or near horizontal applications. In other applications, this secondary reaction chamber could be used to generate commercially viable products.

FIG. 2 also shows the contemplated $(ClO_2)^0$ generator (3-H) providing $(ClO_2)^0$ that has been suspended in water to the ballast water treatment device (3-E). Related literature discloses that $ClO_2$ dosed at 5 ppm concentration into ballast water eradicates most planktonic organisms and bacteria.

Example 4

FIG. 3 shows in detail the actual $(ClO_2)^0$ dosing and control methodology included in the rectangle marked "E" on FIG. 2. The technology described in this ballast water treatment is intrinsically safe because the process does not proceed unless the seawater pump (3-S) is operating. The $(ClO_2)^0$ is only drawn out of a $(ClO_2)^0$ storage tank (3-P) by vacuum generated in a Venturi (3-N) and that only occurs when pump (3-S) is operating. This prevents over dosing or chemical spills due to siphoning errors or pumping errors that could occur if the $(ClO_2)^0$ was pumped out of the storage tank (3-P). Table 5 shows a series of information related to FIG. 3 for reference.

TABLE 5

KEY EXPLANATION

| | |
|---|---|
| A | Vessel inner hull or tankage partition |
| B | Ballast water |
| C | Outer hull of the vessel |
| D1 | Treated ballast water is pumped back into the sea |
| D2 | Treated ballast water is pumped back into holding tank |
| E | Ballast water treatment device that utilizes $ClO_2$ as the disinfectant. |
| F | Ballast water pumped into the ballast water treatment device |
| G | $(ClO_2)°$ suspended in water is pumped from the $(ClO_2)°$ generator to the ballast water treatment device |
| H | $(ClO_2)°$ generator. There are many options and this patent can utilize any that deliver the $(ClO_2)°$ without unreacted chemicals or undesirable byproducts. |
| I | Chemical storage tanks for the $(ClO_2)°$ generator. Chemical requirement vary by process |
| J | Basic compound such as sodium hydroxide |
| K | Automated chemical metering pump |
| L | pH probe |
| M | Static mixer |
| N | Venturi |
| O | Automated valve and flow indicator |
| P | Storage tank for water with suspended $(ClO_2)°$ |
| Q | Vent to open air |
| R | Supply of $(ClO_2)°$ suspended in water from $(ClO_2)°$ generator (H) |
| S | Automated variable speed pump |
| T | Analytical instrument for measurement of $(ClO_2)°$ suspended in water |
| U | Instrument for transmitting water flow rate with local display |

Example 5

Figure 4:
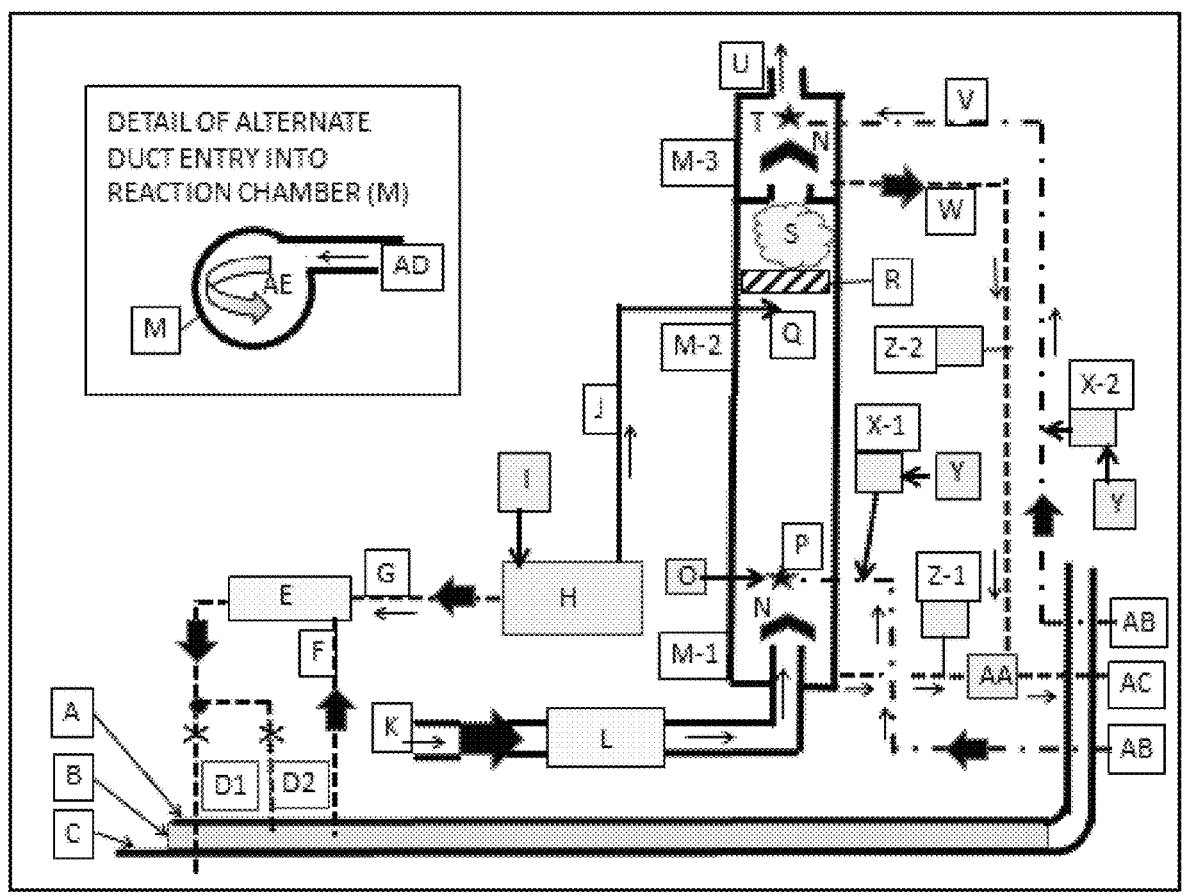
FIG. 4 shows an example of a contemplated process consisting of two modules: exhaust gas SOx pre-treatment, NOx, SOx, organic compounds, particulates, particulate matter and combinations thereof scrubbing and post scrubbing gas treatment are combined in one module, and ballast water treatment in a separate module. Both modules share the same chemical generation system.

FIG. 4 shows a contemplated reaction chamber and system for a single stage pretreatment and treatment system. This reaction chamber includes three separate chemical treatments to the exhaust gas. The first removes the majority of the SOx in a pre-treatment (4-M-1). The second treatment removes essentially all of the NOx, SOx, organic compounds, particulates, particulate matter and combinations thereof (40M-2) and the final treatment (4-M-3) removes the NOx, SOx, organic compounds, particulates, particulate matter and combinations thereof reaction products from the exhaust gas stream as salts or commercially viable products. Table 6 shows a series of information related to FIG. 4 for reference.

TABLE 6

| | KEY EXPLANATION |
|---|---|
| A | Vessel inner hull or tankage partition |
| B | Ballast water |
| C | Vessel outer hull |
| D1 | Treated ballast water is pumped back into the sea |
| D2 | Treated ballast water is pumped back into holding tank |
| E | Ballast water treatment device that utilizes $ClO_2$ as the disinfectant |
| F | Ballast water pumped into the ballast water treatment device |
| G | $(ClO_2)°$ suspended in water is pumped from the $(ClO_2)°$ generator to the ballast water treatment device |
| H | $(ClO_2)°$ generator. There are many options and this patent can utilize any that deliver the $(ClO_2)°$ without unreacted chemicals or undesirable byproducts. |
| I | Chemical storage tanks for the $(ClO_2)°$ generator. Chemical requirement vary by process |
| J | $(ClO_2)°$ in gas phase mixed with air or other gas is pulled into the NOx, SOx, organic compounds, particulates, particulate matter and combinations thereof reaction chamber by differential pressure. Alternatively this can be liquid with suspended $(ClO_2)°$. |
| K | Hot exhaust gas from a combustion source or an SCR NOx scrubber |
| L | Heat exchanger. The process can transfer heat into gas or liquid for use elsewhere |
| M-1 | SOx pretreatment end of single scrubbing vessel |
| M-2 | NOx, SOx, organic compounds, particulates, particulate matter and combinations thereof end of a single scrubbing vessel |
| M-3 | Gas polishing post treatment module |
| N | Generic air water separator |
| O | Device for pressurizing and regulating the flow of gas or liquid into the nozzles (P). Source for pressurized gas or fluid not shown |
| P | Nozzles integrating seawater or metal oxide solution with high pressure gas and/or liquid to produce liquid droplets with high surface area |
| Q | $(ClO_2)°$ gas diffusion device or liquid spray nozzle for NOx, SOx, organic compounds, particulates, particulate matter and combinations thereof abatement in M-2 portion of the reaction chamber |
| R | Generic static mixer |
| S | Mist cloud of $(ClO_2)°$ and NOx, SOx, organic compounds, particulates, particulate matter and combinations thereof in gas phase - with or without colloidal liquid droplets in the M-2 portion of the reaction chamber |
| T | Nozzle with or without gas/hydraulic atomization |
| U | Exhaust gas with exceptionally low levels of SOx and NOx |
| V | Seawater pumped into the M-3 gas polishing module |
| W | Wastewater pumped to the seawater reclamation device (AA) |
| X-1 | Automated chemical metering device for metal oxide solution such as NaOH |
| X-2 | Automated chemical metering device for metal oxide solution such as NaOH |
| Y | Seawater pumped into the SOx pretreatment portion of scrubber (M-1) |
| Z-1 | pH probe connected via control panel (not shown) to chemical metering pump (X-1) for addition of metal oxide material (Y) as required to maintain pH set point |
| Z-2 | pH probe connected via control panel (not shown) to chemical metering pump (X-2) for addition of metal oxide (Y) as required to maintain pH set point |
| AA | Seawater reclamation device that removes particulate and adjusts pH |
| AB | Seawater inlet |
| AC | Seawater discharge |
| AD | Duct tangentially entering an end of the TIP SOx reaction vessel (M) |
| AE | Image indicating the swirl introduced into the exhaust gas by (AD) |

Example 6

FIG. 5 shows a contemplated three stage treatment occurring in a "two-connected reaction chamber and system" configuration. The first stage SOx pre-treatment occurs in the first reaction chamber module (5-M). The second stage NOx, SOx, organic compounds, particulates, particulate matter and combinations thereof treatment and third stage gas cleaning occur in the second module (5-Q). The ballast water treatment module (5-E) is also shown. Table 7 shows a series of information related to FIG. 5 for reference.

TABLE 7

| | KEY EXPLANATION |
|---|---|
| A | Vessel inner hull or tankage partition |
| B | Ballast water |
| C | Vessel outer hull |
| D1 | Treated ballast water is pumped back into the sea |
| D2 | Treated ballast water is pumped back into holding tank |
| E | Ballast water treatment device that utilizes $ClO_2$ as the disinfectant |
| F | Ballast water pumped into the ballast water treatment device |
| G | $(ClO_2)°$ suspended in water is pumped from the $(ClO_2)°$ generator to the ballast water treatment device |
| H | $(ClO_2)°$ generator. There are many options and this patent can utilize any that deliver the $(ClO_2)°$ without unreacted chemicals or undesirable byproducts. |

TABLE 7-continued

| KEY | EXPLANATION |
|---|---|
| I | Chemical storage tanks for the $(ClO_2)°$ generator. Chemical requirement vary by process |
| J | $(ClO_2)°$ in gas phase mixed with air or other gas is pulled into the TIP reaction chamber by differential pressure |
| K | Hot exhaust gas from a combustion source or an SCR NOx scrubber |
| L | Heat exchanger. The process can transfer heat into gas or liquid for use elsewhere |
| M | TIP SOx scrubbing vessel |
| N | Generic air water separator |
| O | Device for pressurizing and regulating the flow of gas or liquid into the nozzles (P). Source for pressurized gas or fluid not shown |
| P | Nozzles integrating seawater with high pressure gas and/or liquid to produce liquid droplets with high surface area |
| Q | TIP reaction vessel for NOx, SOx, organic compounds, particulates, particulate matter and combinations thereof abatement |
| R | Generic static mixer |
| S | Mist cloud of $(ClO_2)°$ and NOx, SOx, organic compounds, particulates, particulate matter and combinations thereof in gas phase - with or without colloidal liquid droplets |
| T | Nozzle with or without gas/hydraulic atomization |
| U | Exhaust gas with exceptionally low levels of SOx and NOx |
| V | Seawater pumped into the TIP scrubber exhaust gas polishing step |
| W | Wastewater pumped to the seawater reclamation device (Z) |
| X | Drain for condensate accumulated in the TIP reaction chamber (Q) |
| Y | Seawater pumped into the TIP SOx scrubber (M) |
| Z | Seawater reclamation device that removes particulate and adjusts pH |
| AA | Automated chemical metering device for caustic solution such as NaOH |
| AB | Tank for caustic solution |
| AC | pH probe connected via TIP sensor and control array (not shown) to chemical metering pump (AA) for addition of caustic material (AA) as required to maintain pH set point |
| AD | Duct tangentially entering an end of the TIP SOx reaction vessel (M) |
| AE | Image indicating the swirl introduced into the exhaust gas by (AD) |

Example 7

Figure 6:
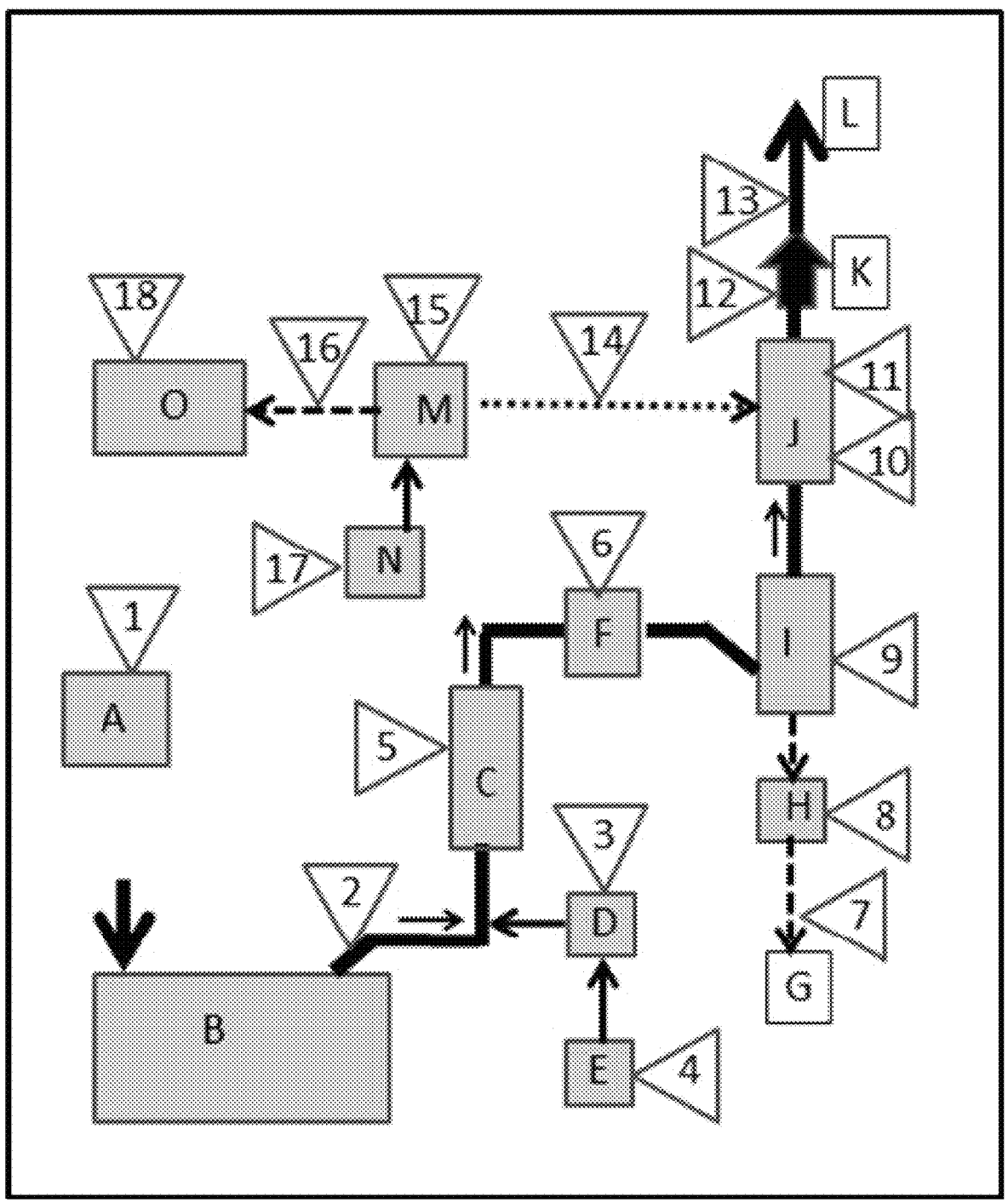
FIG. 6 shows a contemplated instrumentation and control network for the integrated group of modules included in this process.

FIG. 6 shows a contemplated sensor and automated control configuration or control system for the integrated exhaust and ballast water treatment modules. As used herein, the term "automated control system" means an integrated series of devices that detect and effect changes to specific process conditions through regulation of the function of subordinate equipment states and relay this information via wired and non-wired means to a local or integrated control device. The local control device(s) has the ability to operate autonomously in "local" mode or subordinate process control to an integrated control device when in "automated mode". The control devices have the ability to effect change in the chemical processes by making changes to the equipment state. For example, by opening and closing valves, dampers rates of motion and turning on or off lights and other indicators of process condition. The integrated control device has the ability to commutate with and effect change in all components of the equipment when subordinate local control devices are operated in automatic mode. The integrated control device also communicates with other control devices aboard the vessel and may have the ability to communicate with technical support services. Table 8 shows a series of information related to FIG. 6 for reference.

TABLE 8

| KEY | EXPLANATION |
|---|---|
| A | Central control panel. Many of the modules have local control panels, but all can subordinate to remote control by the central control panel |
| B | Combustion exhaust source - typically engine or boiler |
| C | Pretreatment NOx destruction by Selective Catalytic Reduction (SCR) - or equal |
| D | Automated chemical dosing for SCR |
| E | Chemical storage tank for SCR |
| F | Heat exchanger(gas/gas or gas/liquid) |
| G | Treated water discharge into sea |
| H | Water treatment module |
| I | $SO_2$ Pretreatment module |
| J | NOx, SOx, organic compounds, particulates, particulate matter and combinations thereof treatment module |
| K | Exhaust blower |
| L | Exhaust stack |
| M | $(ClO_2)°$ generator module |
| N | Chemical storage for $(ClO_2)°$ generator module |
| O | Ballast water treatment module |
| 1 | Sensor - Control panel unauthorized access |
| 2 | Sensor - Exhaust gas temperature and flow |
| 3 | Analog/digital performance confirmation data from local control system |
| 4 | Sensor - Tank level |
| 5 | Analog/digital performance confirmation data from local control system |

TABLE 8-continued

| KEY | EXPLANATION |
|---|---|
| 6 | Sensor - Gas temperature, coolant liquid/gas temperature<br>Control - Coolant water/gas flow rate |
| 7 | Sensors - pH, Total Dissolved Solids, flow and others as required by regulations<br>Control - Bypass to holding tank if water quality set points are not met/shut down system |
| 8 | Analog/digital performance confirmation data from local control system<br>Control - Chemical dosing rate as required to meet water quality performance set points |
| 9 | Sensor - $SO_2$ level at vessel discharge, nozzle gas flow and pressure, Nozzle liquid flow and pressure, pH of liquid feed to nozzle, liquid level in reaction vessel<br>Control - Liquid and gas flow to nozzles, rate of metal hydroxide addition to liquid feed to nozzles, pump to remove liquid from reaction vessel |
| 10 | Sensor - Chamber differential pressure across static mixer and compared to ambient atmospheric pressure, liquid level in vessel<br>Control - Exhaust fan speed as required to maintain differential pressure set point between vessel and atmosphere |
| 11 | Sensor - Nozzle liquid pressure and flow, liquid level in compartment<br>Control - Liquid flow rate to nozzle |
| 12 | Control - fan speed (VFD) |
| 13 | Sensor - $SO_2$, NOx, $(ClO_2)°$ gas flow rate<br>Control - $(ClO_2)°$ flow rate |
| 14 | Sensor - $(ClO_2)°$ flow rate |
| 15 | Sensor - many sensors - varies by $(ClO_2)°$ generator type<br>Control - all functions of $(ClO_2)°$ generator |
| 16 | Sensor - $(ClO_2)°$ flow rate |
| 17 | Sensor - Tank level |
| 18 | Sensors - $(ClO_2)°$ level in pre and post treated seawater, seawater flow rate, pH of water, liquid level in tanks<br>Controls - Chemical metering of metal hydroxide addition, flow rate of $(ClO_2)°$, selection of valves as required to operate the system |

Example 8

Figure 7:
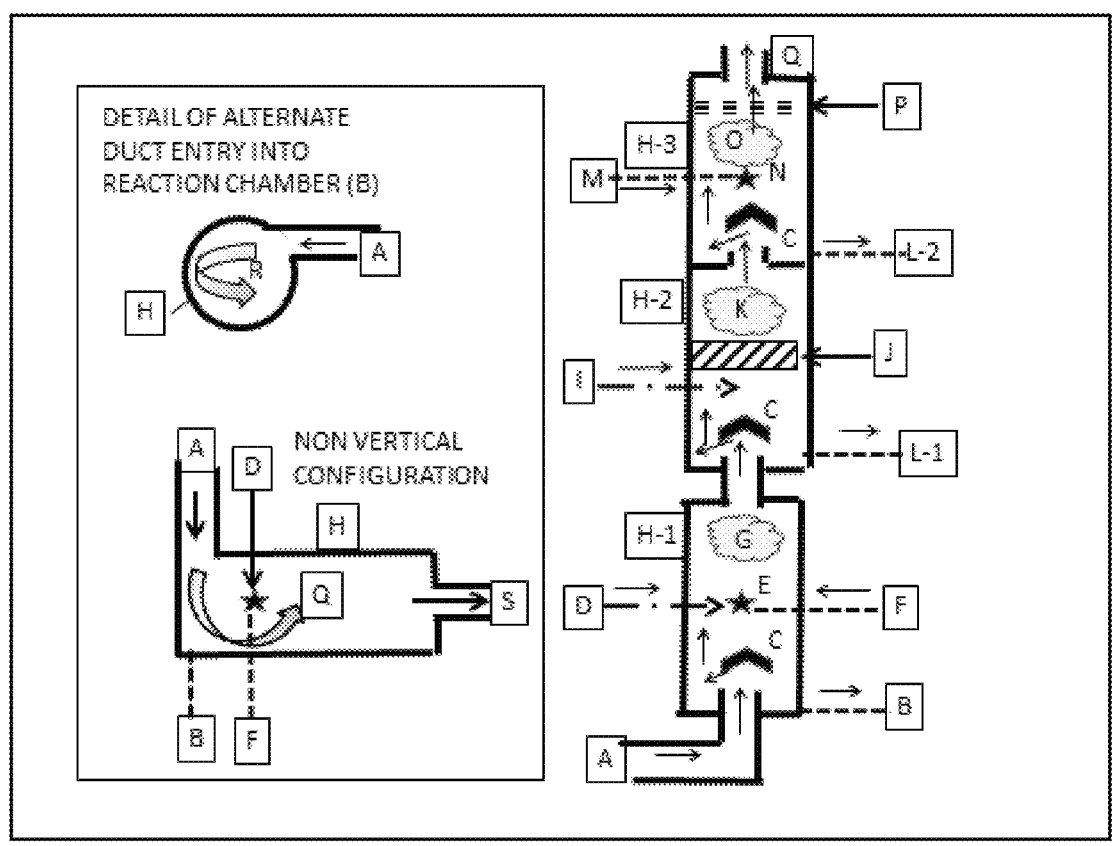
FIG. 7 shows an exhaust gas treatment portion of the contemplated process in an expanded view. The exhaust SOx pretreatment is in one module and a second module combines NOx, SOx, organic compounds, particulates, particulate matter and combinations thereof scrubbing and post scrubbing gas treatment.
Figure 8:
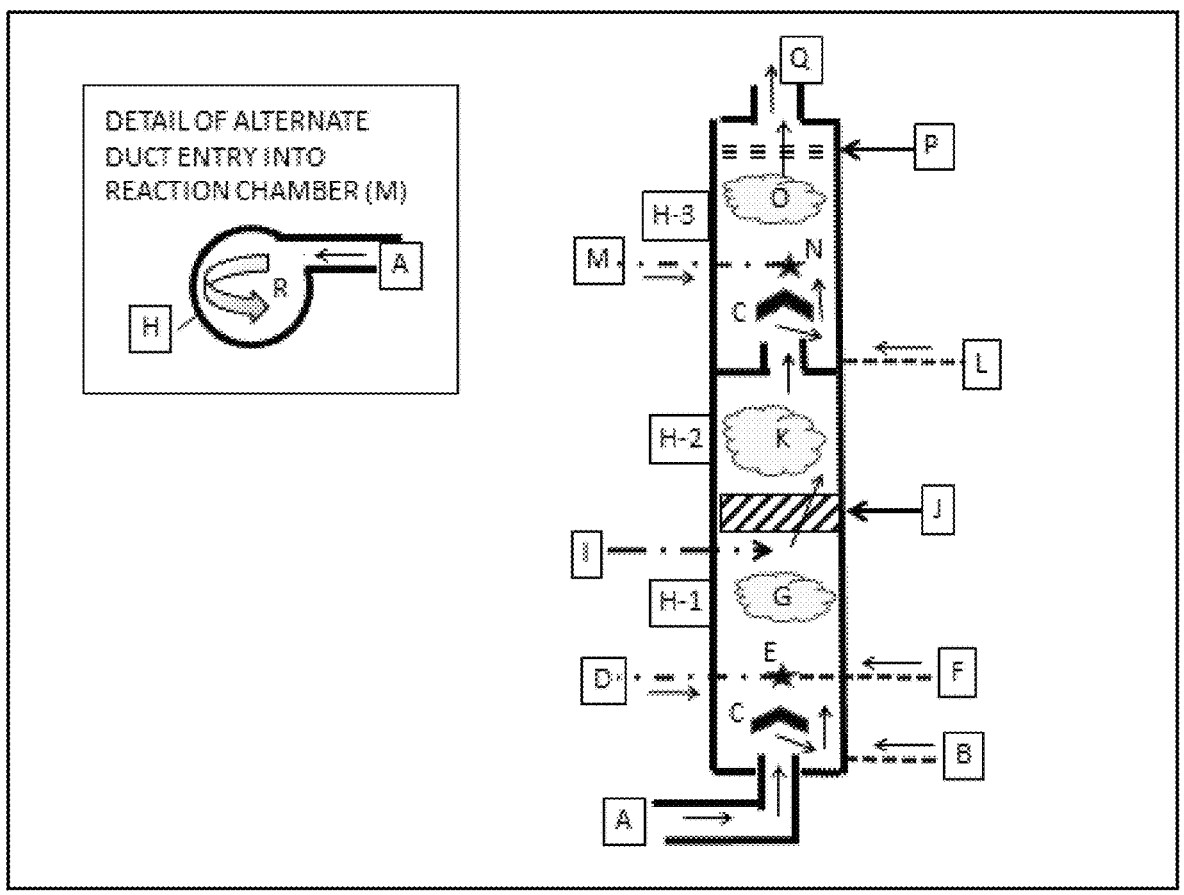
FIG. 8 shows the exhaust gas treatment portion of the contemplated process in an expanded view. The exhaust SOx pretreatment, NOx, SOx, organic compounds, particulates, particulate matter and combinations thereof scrubbing and post scrubbing gas treatment are combined in a single module.

Two systems that have all three components: pretreatment, treatment, and post-treatment are shown as a part of this Example—in FIGS. 7 and 8.

FIG. 7 shows the exhaust gas treatment portion of the contemplated process in an expanded view. The exhaust SOx pretreatment is in one module and a second module combines NOx, SOx, organic compounds, particulates, particulate matter and combinations thereof scrubbing and post scrubbing gas treatment. Table 8 shows the key components of FIG. 7.

TABLE 9

| KEY | EXPLANATION |
|---|---|
| A | Exhaust gas from combustion source. |
| B | Condensate drain from H-1 & H-2 chamber |
| C | Air water separator. Only necessary when reaction vessel is in the vertical orientation. |
| D | Pressurized gas for gas atomized nozzle |
| E | Nozzle - can be gas atomized or liquid atomized or in some instances fine hydraulic nozzle |
| F | Pressurized stream of seawater and/or other waters that have alkaline material added to increase pH |
| G | Fine mist cloud mixture of high pH liquid water and exhaust gas |
| H-1 | SOx scrubbing stage |
| H-2 | NOx, SOx, organic compounds, particulates, particulate matter and combinations thereof scrubbing stage |
| H-3 | Gas conditioning stage - removes/converts reaction products from NOx, SOx, organic compounds, particulates, particulate matter and combinations thereof scrubbing into salts or other compounds. |
| I | $(ClO_2)°$ addition as gas or fine mist |
| J | Static mixer(s) |
| K | Gas mixture of $(ClO_2)°$ and exhaust gas |
| L | Condensate drain from gas conditioning chamber |
| M | Pressurized stream of compounds selected as required to accomplish a specific gas conditioning result. |
| N | Nozzle can be hydraulic atomized or hydraulic nozzle. |
| O | Fine mist cloud mixture of exhaust gas and process specific compounds |
| P | Demister |
| Q | Cleaned exhaust gas |
| R | Describes swirl motion introduced into the exhaust gas when exhaust gas is introduced into the reaction chamber through a duct that is tangentially oriented to the chamber wall |

FIG. 8 shows the exhaust gas treatment portion of the contemplated process in an expanded view. The exhaust SOx pretreatment, NOx, SOx, organic compounds, particulates, particulate matter and combinations thereof scrubbing and post scrubbing gas treatment are combined in a single module. Table 8 also applies to the key components of FIG. 8.

Example 9

A NOx, SOx, or a combination thereof abatement or scrubbing process (NOx, SOx, organic compounds, particulates, particulate matter and combinations thereof treatment module) for marine vessel flue gas, can be accomplished in a single-chambered module as generally described earlier. A contemplated process is included in this example.

Exhaust gas is drawn into the first end of the NOx, SOx, organic compounds, particulates, particulate matter and combinations thereof reaction chamber and continues to move through the chamber to the second end of the chamber. The $(ClO_2)^0$ as gas, or suspended in a liquid mist, or droplets is drawn or pushed into a contemplated NOx, SOx, organic compounds, particulates, particulate matter and combinations thereof reaction chamber at a point downstream of the first end of the chamber. The exhaust gas and $(ClO_2)^0$ can be drawn into and through the reaction chamber by the lower exhaust gas pressure at the second end of the chamber, as compared to the first end of the chamber or pulled into the reaction chamber by the vacuum induced through the use of a Venturi or similar device or pushed into the reaction chamber with a blower similar device.

Downstream of the point $(ClO_2)^0$ is introduced into the reaction chamber, the $(ClO_2)^0$ and exhaust gas are pushed or pulled through a static mixer or mixers of any conventional design. When gas phase $(ClO_2)^0$ is introduced into the reaction chamber, the static mixers can be placed immediately downstream of the point where the $(ClO_2)^0$ is added. In some embodiments when $(ClO_2)^0$ is introduced into the reaction chamber as a mist or droplets, the static mixers are place sufficiently downstream of the point where the $(ClO_2)^0$ is introduced to allow the mist or droplets to evaporate. The chamber has sufficient volume to provide 0.5 second, 1.0 seconds, 1.5 seconds of residence time for a reaction between the $(ClO_2)^0$ and the NOx/SOx/OC's or particulate. The mixed gases continue down the length of the reaction chamber while the NOx and $SO_2$ abatement reactions described in equations [2], [3] and [4] occur.

$$5NO+2(ClO_2)^0+H_2O \rightarrow 5NO_2+2HCl \quad [2]$$

$$5NO_2+(ClO_2)^0+3H_2O \rightarrow 5HNO_3+HCl \quad [3]$$

$$5SO_2+2(ClO_2)^0+6H_2O \rightarrow 5H_2SO_4+2HCl \quad [4]$$

In some embodiments, NOx, SOx, organic compounds, particulates, particulate matter and combinations thereof abatement process occurs in a module with two chambers. In this two-chambered module embodiment, the NOx, SOx, organic compounds, particulates, particulate matter and combinations thereof abatement occurs in the first of two chambers to receive exhaust gas enters the first opening of the first chamber of the module and then moves through the chamber as described above then exits the second opening at or near the other end of the first chamber wherein it enters the first opening of the second chamber inn the module. The second chamber within the module provides post treatment conditioning to the exhaust gas after NOx, SOx, organic compounds, particulates, particulate matter and combinations thereof scrubbing. At a point after the first opening of the second chamber, a device or devices introduce liquid or additional gas stream into the second chamber of the post-treatment product chamber. This chamber removes the NOx/SOx/OC/particulate reaction products in a number of ways including gas phase and liquid phase chemical reactions, as well as washing, dissolving, suspending the reaction products from of the exhaust or other gas using a liquid phase. The liquid phase can be a mist, spray, deluge, bubbling or other means of inducing contact between the exhaust or other gas and the liquid.

The gas or liquid phase contain chemicals as previously described to facilitate reactions, washing, dissolving, suspending of the NOx/SOx/OCs and particulate in the exhaust gas or other gas stream. The liquid introduced to facilitate the above actions is then drained from the second chamber of the module through one or more orifices. The volume of the second chamber is sufficiently large to accommodate the successful interaction between the gas or liquid introduced into the chamber to effect removal of the NOx/SOx/OC's and particulate reaction byproducts from the exhaust gas or other gas stream prior to the exhaust gas or other gas exit from the second chamber through a second opening at or near the end of the chamber most removed from the first opening.

Example 10

Figure 9:
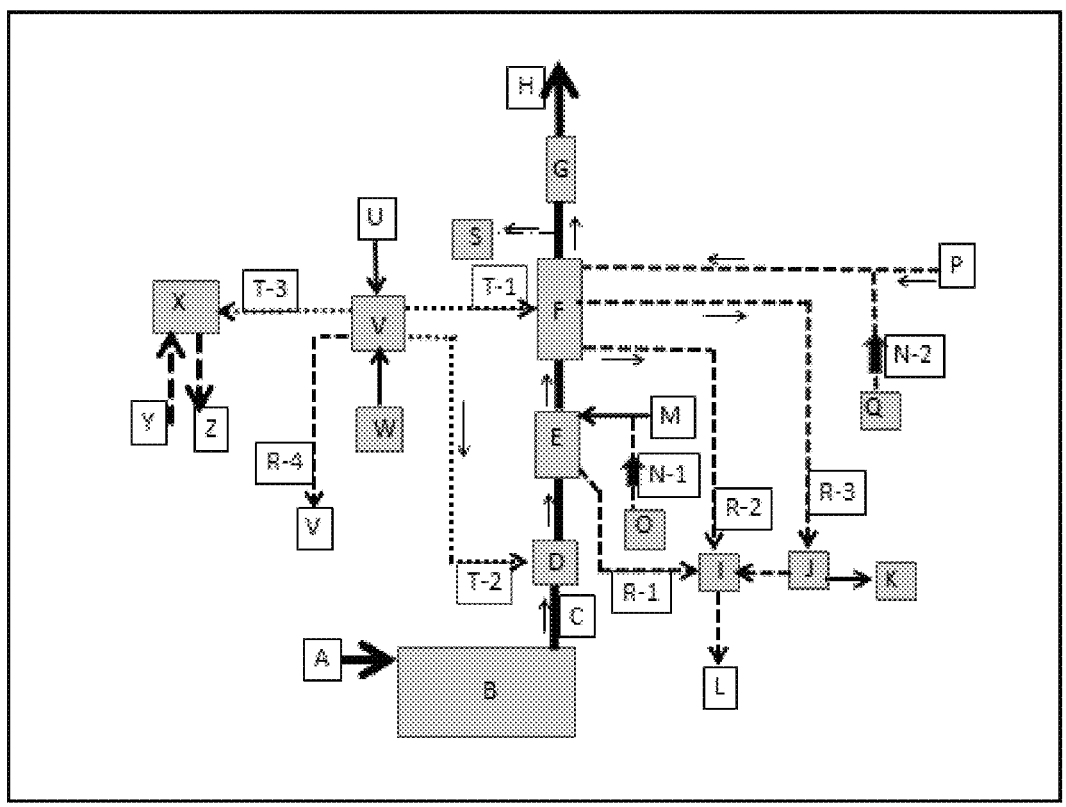
FIG. 9 shows an example of an integrated package of a contemplated particulate/organic compound treatment, exhaust gas treatment and ballast water treatment.

FIG. 9 shows an example of a contemplated overall integrated module configuration described in this patent. It shows just one option for a post-treatment product module but others are described in this document.

The chlorine dioxide generator [V] is shown with distribution of $(ClO_2)^0$ in gas or suspended in liquid to the organic compound and particulate scrubber module [D], Integrated NOx/SO$_2$/post-treatment scrubber module [F] and ballast water treatment module [X]. This feature minimizes equipment cost by sharing a single $(ClO_2)^0$ generator. FIG. 9 also provides process flow for water and water treatment associated with the various modules.

Table 10 identifies the items shown on FIG. 9:

| KEY | EXPLANATION |
|---|---|
| A | Fresh air intake to the combustion device (engine, boiler etc.) |
| B | Combustion device (engine, boiler etc.) |
| C | Exhaust stack carries exhaust from combustion source |
| D | Organic compound & particulate abatement Module for soot filter system |
| E | Pretreatment SOx Scrubber module |
| F | Integrated NOx/SO$_2$/Post-treatment Scrubber Module |
| G | Optional silencer |
| H | Clean air |
| I | Process wastewater treatment system |
| J | Sodium nitrate/nitrite, ammonium nitrate and ammonium chloride separation system |

| KEY | EXPLANATION |
|---|---|
| K | Sodium nitrate/nitrite, or ammonium nitrate or ammonium chloride storage |
| L | Seawater or other body of water |
| M | Seawater or other water supply |
| N-1 | Remotely speed controlled alkaline material metering pump |
| N-2 | Remotely speed controlled alkaline material metering pump |
| O | Alkaline material |
| P | Water (pressurized) |
| Q | Alkaline material and process enhancer per equation #9 |
| R-1 | Process wastewater from pretreatment SO2 scrubber module |
| R-2 | Process wastewater from NOx/SO2 scrubber stage of integrated NOx/SO2/Posttreatment module |
| R-3 | Process wastewater from posttreatment stage of integrated NOx/SO2/Posttreatment module |
| R-4 | Process wastewater from water conditioning section of $(ClO_2)°$ generator |
| S | FTIR or equal sensor with data transfer to integrated process control center (BE) |
| T-1 | $(ClO_2)°$ diluted in air or other gas or suspended in water for NOx, SOx, organic compounds, particulates, particulate matter and combinations thereof abatement pursuant to equations 2-5 |
| T-2 | $(ClO_2)°$ diluted air or other gas or suspended in water for OC's destruction |
| T-3 | $(ClO_2)°$ diluted in air or other gas or suspended in water for biological remediation |
| U | Water and/or pressurized air |
| V | $(ClO_2)°$ generator and process wastewater conditioning system |
| W | Chemicals required to generate $(ClO_2)°$ - compound list varies according to process |
| X | Ballast Water Treatment Module that utilizes ClO2 as the disinfectant |
| Y | Untreated ballast water |
| Z | Treated ballast water |

Example 11

Figure 10A:
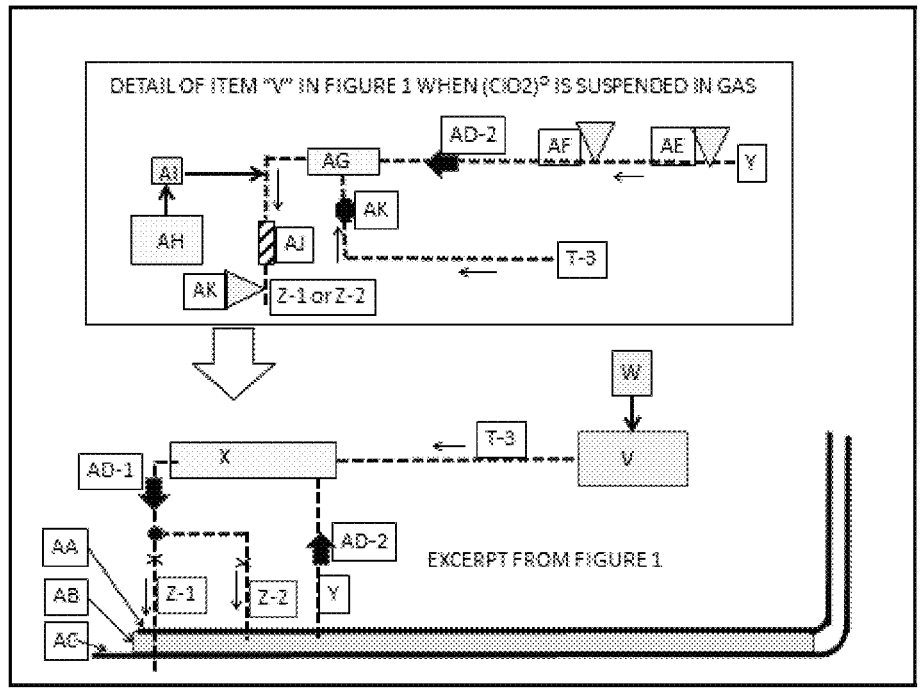
FIGS. 10A and 10B show examples of a contemplated ballast water treatment process.
Figure 10B:
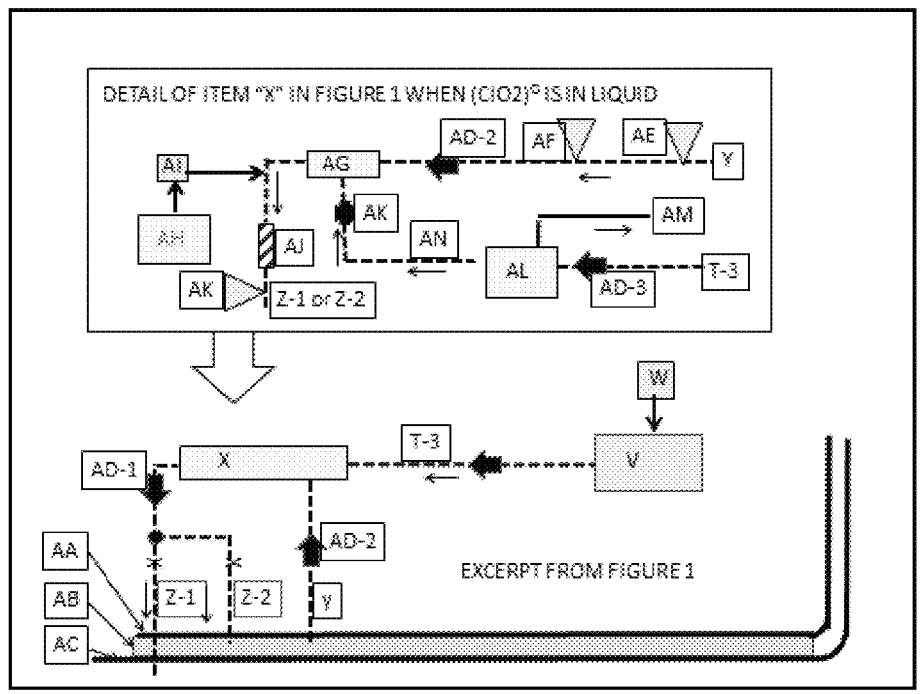

FIGS. 10A and 10B show examples of contemplated Ballast Water Treatment options. FIG. 10A describes the technology used when $(ClO_2)°$ is supplied as a gas diluted in another gas. FIG. 10B describes the technology when $(ClO_2)°$ is suspended in a liquid. Table 11 describes the items identified in the two figures.

TABLE 11

| KEY | EXPLANATION |
|---|---|
| T-3 | $(ClO_2)°$ diluted in air or suspended in water for biological remediation |
| V | $(ClO_2)°$ generator and process wastewater conditioning system |
| W | Chemicals required to generate $(ClO_2)°$ - compound list varies according to process |
| X | Ballast Water Treatment Module that utilizes ClO2 as the disinfectant |
| Y | Untreated ballast water |
| Z-1 | Treated ballast water - returned to the sea or other water body |
| Z-2 | Treated ballast water - returned to vessel |
| AA | Vessel inner hull or tankage partition |
| AB | Ballast water |
| AC | Vessel outer hull |
| AD1 | Pump to move treated water |
| AD2 | Pump to move untreated water |
| AD-3 | Pump to move $(ClO_2)°$ suspended in water |
| AE | Instrument for transmitting water flow rate with local display |
| AF | Analytical instrument for measurement of $(ClO_2)°$ suspended in water |
| AG | Venturi |
| AH | Storage container for basic compound such as sodium hydroxide |
| AI | Automated chemical metering pump |
| AJ | Static mixer |
| AK | Automated valve and flow indicator |
| AL | Storage tank for water with suspended $(ClO_2)°$ |
| AM | Vent to open air |
| AN | $(ClO_2)°$ suspended in water |

Example 12

Figure 11A:
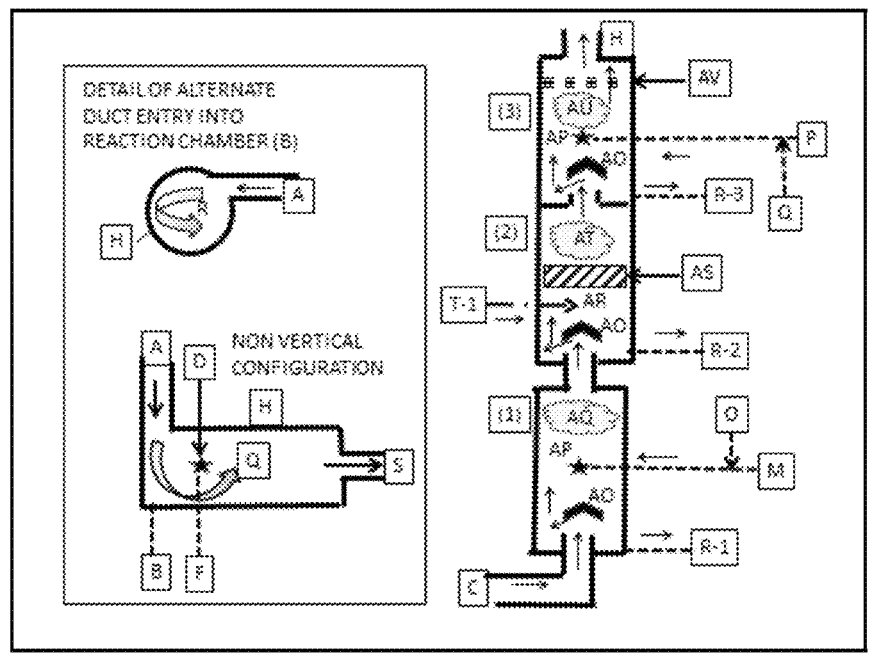
FIGS. 11A and 11B show examples in detail of integrated SOx pretreatment module (herein referred to as "SOx PT") and NOx, SOx, organic compounds, particulates, particulate matter and combinations thereof treatment module (herein referred to as "TM") and post-scrubbing gas polishing chamber.
Figure 11B:
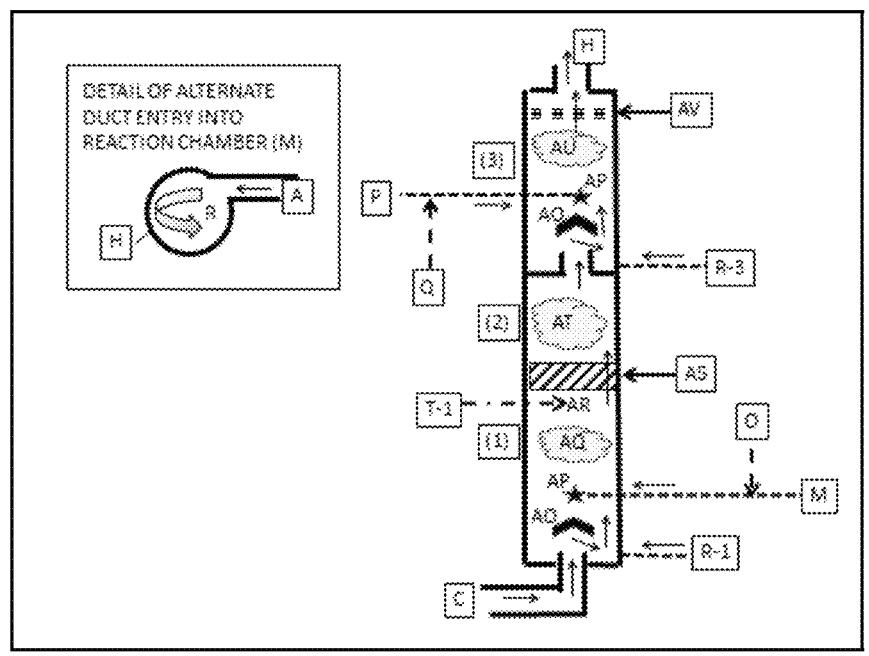
Figure 12:
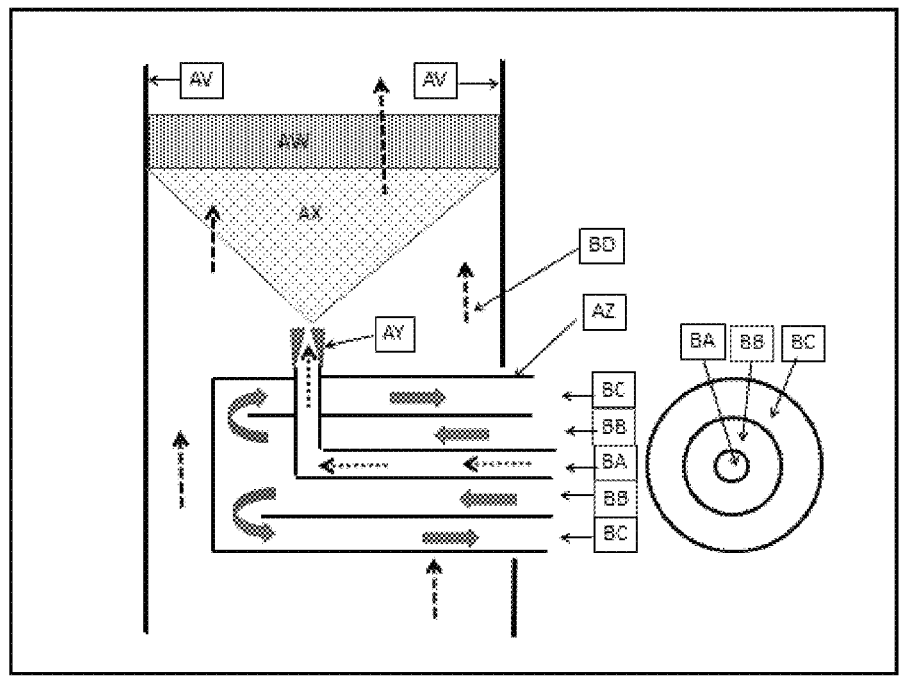
FIG. 12 shows an example of the particulate and organic compound treatment module (herein referred to as "P&OTM").
Figure 13:
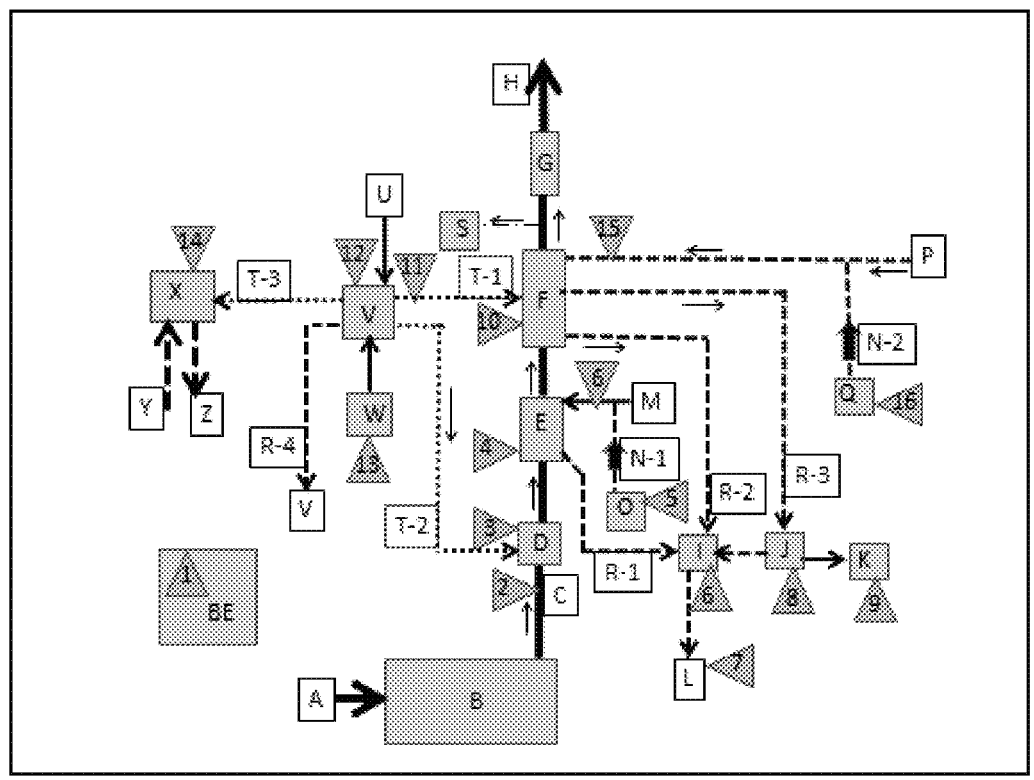
FIG. 13 shows a contemplated instrumentation and control network for the integrated group of modules included in contemplated processes.

FIGS. 11A and 11B show examples of contemplated options for combining the three chambers associated with SOx pretreatment, NOx, SOx, organic compounds, particulates, particulate matter and combinations thereof treatment and post-treatment processes in either one or two modules. FIG. 11A describes configuration of the three chambers in two modules. FIG. 11B describes a configuration of the three modules in one module. Table 12 describes the items identified in the two figures.

TABLE 12

| KEY | EXPLANATION |
|---|---|
| (1) | SOx pretreatment scrubbing stage |
| (2) | NOx, SOx, organic compounds, particulates, particulate matter and combinations thereof scrubbing stage |
| (3) | Gas conditioning stage - removes/converts reaction products from NOx, SOx, organic compounds, particulates, particulate matter and combinations thereof scrubbing into salts or other compounds. |
| C | Exhaust stack carries exhaust from combustion source |
| H | Clean air |
| M | Seawater or other water supply |
| O | Alkaline material |
| P | Water (pressurized) |
| Q | Alkaline material and process enhancer per equation #9 |

TABLE 12-continued

| KEY | EXPLANATION |
|---|---|
| R-1 | Process wastewater from pretreatment SO2 scrubber module |
| R-2 | Process wastewater from NOx/SO2 scrubber stage of integrated NOx/SO2/Post treatment module |
| R-3 | Process wastewater from post treatment stage of integrated NOx/SO2/Posttreatment module |
| T-1 | $(ClO_2)°$ diluted in air or other gas or suspended in water for NOx, SOx, organic compounds, particulates, particulate matter and combinations thereof abatement pursuant to equations 2-5 |
| T-2 | $(ClO_2)°$ diluted air or other gas or suspended in water for OC's destruction |
| T-3 | $(ClO_2)°$ diluted in air or other gas or suspended in water for biological remediation |
| AO | Air water separator. Only necessary when reaction vessel is in the vertical orientation. |
| AP | Nozzle - can be gas atomized or liquid atomized or in some instances fine hydraulic nozzle |
| AQ | Fine mist cloud mixture of high pH liquid water and exhaust gas |
| AR | Venturi(s) or equal used when $(ClO_2)°$ is diluted in air or other gas to pull the mixture into reaction chamber. Low pressure nozzle is used when $(ClO_2)°$ is suspended in liquid. Alternatively the $(ClO_2)°$ is diluted in air or other gas can be pushed into the reaction chamber with a blower or equal. |
| AS | Static mixer(s) |
| AT | Well mixed combination of $(ClO_2)°$ and gas laden with $NOx/SO_2$ or OC's |
| AU | Fine mist cloud mixture of exhaust gas and process specific compounds |
| AV | Demister |

Example 13

FIG. 12 shows examples of contemplated organic compound and particulate abatement module for soot filter systems. This module optimizes the decomposition of $(ClO_2)^0$ by regulating the temperature of the liquid in which the $(ClO_2)^0$ is suspended in. Table 13 describes the items identified in the FIG. 12.

TABLE 13

| KEY | EXPLANATION |
|---|---|
| AV | Outer edges of exhaust stack |
| AW | Adsorbent surface |
| AX | Aerosol of (ClO2)° suspended in chilled liquid |

TABLE 13-continued

| KEY | EXPLANATION |
|---|---|
| AY | Nozzle for liquid atomization |
| AZ | Liquid cooled wand for transport of (ClO2)° suspended in chilled water to atomizing nozzles within exhaust gas stack |
| BA | Tube to transport (ClO2)° suspended in chilled |
| BB | Chilled liquid supply within liquid cooled wand |
| BC | Warmer water return within liquid cooled wand |
| BD | Exhaust gas direction through exhaust gas stack |

Example 14

FIG. 13 shows examples of contemplated integrated automated control systems. Table 14 describes the items shown in FIG. 13.

TABLE 14

| KEY | EXPLANATION |
|---|---|
| 1 | Climatic conditions and security sensors for the process control center |
| 2 | Exhaust gas temperature sensor and transmitter |
| 3 | Sensor package that includes $(ClO_2)°$ temperature, coolant temperature & flow rate |
| 4 | Sensor package including effluent pH and temperature |
| 5 | Tank level sensor and transmitter |
| 6 | Sensor package that includes liquid nitrate concentration, pH, TDS and temperature sensors with transmitter |
| 7 | Seawater or other liquid temperature & pH sensor with transmitter |
| 8 | Sensor package that includes inlet and exit nitrate concentration, flow rate of reactants and |
| 9 | Tank level sensor and transmitter |
| 10 | Sensor package that includes module pressure, temperature of each chamber |
| 11 | Sensor package that includes process flow, temperature and pressure |
| 12 | Sensor package that includes process flow, temperature, pressure and pH in main reaction chamber plus flow rates of added chemicals and water flow rate. |
| 13 | Tank level sensors |
| 14 | Sensor package that includes $(ClO_2)°$ concentration in inlet feed and effluent treated water, water pH & flow rate. |
| 15 | Sensor package that includes liquid flow rate, pH and temperature. |
| 16 | Tank level sensors |
| A | Fresh air intake to the combustion device (engine, boiler etc.) |
| B | Combustion device (engine, boiler etc.) |
| C | Exhaust stack carries exhaust from combustion source |
| D | Organic compound & Particulate Abatement Module for soot filter system |
| E | Pretreatment SOx Scrubber module |
| F | Integrated $NOx/SO_2$/Post-treatment Scrubber Module |
| G | Optional silencer |
| H | Clean air |

TABLE 14-continued

| KEY | EXPLANATION |
|---|---|
| I | Process wastewater treatment system |
| J | Sodium nitrate/nitrite, ammonium nitrate and ammonium chloride separation system |
| K | Sodium nitrate/nitrite, or ammonium nitrate or ammonium chloride storage |
| L | Seawater or other body of water |
| M | Seawater or other water supply |
| N-1 | Remotely speed controlled alkaline material metering pump |
| N-2 | Remotely speed controlled alkaline material metering pump |
| O | Alkaline material |
| P | Water (pressurized) |
| Q | Alkaline material and process enhancer per equation #9 |
| R-1 | Process wastewater from pretreatment SO2 scrubber module |
| R-2 | Process wastewater from NOx/SO2 scrubber stage of integrated NOx/SO2/Posttreatment module |
| R-3 | Process wastewater from posttreatment stage of integrated NOx/SO2/Posttreatment module |
| R-4 | Process wastewater from water conditioning section of $(ClO_2)°$ generator |
| S | FTIR or equal sensor with data transfer to integrated process control center (BE) |
| T-1 | $(ClO_2)°$ diluted in air or suspended in water for NOx, SOx, organic compounds, particulates, particulate matter and combinations thereof abatement pursuant to equations 2-5 |
| T-2 | $(ClO_2)°$ diluted air or suspended in water for OC's destruction |
| T-3 | $(ClO_2)°$ diluted in air or suspended in water for biological remediation |
| U | Water and/or pressurized air |
| V | $(ClO_2)°$ generator and process wastewater conditioning system |
| W | Chemicals required to generate $(ClO_2)°$ - compound list varies according to process |
| X | Ballast Water Treatment Module that utilizes ClO2 as the disinfectant |
| Y | Untreated ballast water |
| Z | Treated ballast water |
| BE | Integrated process control center |

Example 15

FIG. 14 shows contemplated separation/evaporation technology for nitrogen compound and commercially viable product separation from post scrubber processes.

Table 15 describes the items shown in FIG. 14.

TABLE 15

| KEY | EXPLANATION |
|---|---|
| AV | Outer edges of exhaust stack |
| AW | Adsorbent surface |
| AX | Aerosol of (ClO2)° suspended in chilled liquid |
| AY | Nozzle for liquid atomization |
| AZ | Liquid cooled wand for transport of (ClO2)° suspended in chilled water to atomizing nozzles within exhaust gas stack |
| BA | Tube to transport (ClO2)° suspended in chilled |
| BB | Chilled liquid supply within liquid cooled wand |
| BC | Warmer water return within liquid cooled wand |
| BD | Exhaust gas direction through exhaust gas stack |

Example 16

FIG. 15 show examples of contemplated nitrogen removal systems.

Item [J] is envisioned as a thin film dryer or air drying system. Table 16 describes the items in FIG. 15.

TABLE 16

| KEY | EXPLANATION |
|---|---|
| J | Sodium nitrate/nitrite, ammonium nitrate and ammonium chloride separation system |
| K | Sodium nitrate/nitrite, or ammonium nitrate or ammonium chloride storage |
| N-3 | Remotely speed controlled slurry pump |
| R-3 | Process wastewater from posttreatment stage of integrated NOx/SO2/Posttreatment module |
| AW | Water vapor released to atmosphere or stored as water |

Thus, specific embodiments, methods of using chlorine dioxide to remove NOx, SOx, organic compounds, particulate matter, or a combination thereof from marine exhaust, including pre-treatment and post-treatment solutions, have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A pretreatment system or apparatus for removing SOx molecules from a contaminated gas stream, comprising:

a reaction chamber, comprising an interior area, a gas inlet at or near a first end of the chamber, and a gas outlet at or near a second end of the chamber;

a water supply line that supplies a liquid, wherein the line is coupled with the inlet of the reaction chamber;

a gas atomization nozzle array that is coupled to the water supply line and the reaction chamber, wherein the nozzle array sprays a blanket layer of small liquid droplets, wherein each droplet comprises a diameter, that create a high surface area of liquid across the interior surface of the reaction chamber or creates a mist that can interact with the contaminated gas;
a pH sensor coupled to the water supply line;
at least one chemical metering pump coupled to the pH sensor and the water supply line, wherein the pump can provide an alkaline material into the water supply line to adjust the pH of the water before it is sprayed into the reaction chamber; and
a drain coupled to the reaction chamber that removes liquid that accumulates in the reaction chamber, wherein the system or apparatus removes at least some of the SOx molecules from the contaminated gas by converting at least some of the SOx molecules to sulfate ions.

2. The pretreatment system of claim 1, wherein the liquid that the water supply line supplies comprises seawater, pure water with additional metal hydroxide, carbonates, bicarbonates, ammonia components, or a combination thereof potable water with additional metal hydroxide, carbonates, bicarbonates, ammonia components, or a combination thereof, tainted water with additional metal hydroxide, carbonates, bicarbonates, ammonia components, or a combination thereof.

3. A pretreatment method or process for removing SOx molecules from marine vessel contaminated gas, comprising:
providing a reaction chamber, comprising an interior area, a gas inlet at or near a first end of the chamber, and a gas outlet at or near a second end of the chamber;
providing a water supply line that supplies a liquid, wherein the line is coupled with the inlet of the reaction chamber;
providing a gas atomization nozzle array that is coupled to the water supply line and the reaction chamber, wherein the nozzle array sprays a blanket layer of small liquid droplets, wherein each droplet comprises a diameter, that create a high surface area of liquid across the interior surface of the reaction chamber or creates a mist that can interact with the contaminated gas;
providing a pH sensor coupled to the water supply line;
providing at least one chemical metering pump coupled to the pH sensor and the water supply line, wherein the pump can provide an alkaline material into the water supply line to adjust the pH of the water before it is sprayed into the reaction chamber; and
providing a drain coupled to the reaction chamber that removes liquid that accumulates in the reaction chamber, wherein the system or apparatus removes at least some of the SOx molecule from the contaminated gas by converting it to sulfate ions.

4. A gas stream component abatement or scrubbing system for marine vessel contaminated gas, exhaust gas, or flue gas, comprising:
a pretreatment system having a first end and second end, wherein the second end of the pretreatment reaction chamber is coupled with a first end or an inlet end of a second reaction chamber; and
an inlet for introducing chlorine dioxide into the second reaction chamber, wherein the second reaction chamber is equipped with one or more turbulence inducing devices configured for inducing turbulence, wherein the turbulence inducing device is a stationary device, and wherein the exhaust gas or gas to be treated from the first reaction chamber travels from the outlet end of the first reaction chamber to the first end or inlet end of the second reaction chamber.

5. The gas stream component abatement or scrubbing system for marine vessel contaminated gas, exhaust gas, or flue gas of claim 4, wherein the contaminated gas, exhaust gas, or flue gas comprises at least one NOx component, SOx component, organic compound, particulate, particulate matter, or a combination thereof.

6. A gas stream component abatement or scrubbing system for marine vessel contaminated gas, exhaust gas, or flue gas, comprising:
the pretreatment system of claim 1, wherein the second end of the pretreatment reaction chamber is coupled with a first end or an inlet end of a second reaction chamber; and
an inlet for introducing chlorine dioxide into the second reaction chamber, wherein the second reaction chamber is equipped with one or more turbulence inducing devices configured for inducing turbulence, wherein the turbulence inducing device is a stationary device, and wherein the exhaust gas or gas to be treated from the first reaction chamber travels from the outlet end of the first reaction chamber to the first end or inlet end of the second reaction chamber.

7. A gas stream component abatement or scrubbing system for marine vessel contaminated gas, exhaust gas, or flue gas, comprising:
the pretreatment system of claim 1, wherein the pretreatment reaction chamber is also utilized for scrubbing NOx, SOx, or a combination thereof; and
an inlet for introducing chlorine dioxide into the reaction chamber, wherein the reaction chamber is equipped with one or more turbulence inducing devices configured for inducing turbulence, wherein the turbulence inducing device is a stationary device, and wherein the exhaust gas remains in the reaction chamber for treatment with non-ionic chlorine dioxide.

8. The gas stream component abatement or scrubbing system for marine vessel contaminated gas, exhaust gas, or flue gas of claim 7, wherein the contaminated gas, exhaust gas, or flue gas comprises at least one NOx component, SOx component, organic compound, particulate, particulate matter, or a combination thereof.

9. A gas stream component abatement or scrubbing system for marine vessel contaminated gas, exhaust gas, or flue gas, comprising:
a pretreatment system having a first end and a second end, wherein the second end of the pretreatment reaction chamber is coupled with a first end or an inlet end of a second reaction chamber;
an inlet for introducing chlorine dioxide into the second reaction chamber, wherein the second reaction chamber is equipped with one or more turbulence inducing devices configured for inducing turbulence, wherein the turbulence inducing device is a stationary device, and wherein the exhaust gas or gas to be treated from the pretreatment reaction chamber travels from the outlet end of the pretreatment reaction chamber to the first end or inlet end of the second reaction chamber; and
an inlet for a post-treatment chamber that is coupled with the second end of the second reaction chamber, wherein at least one product of the second reaction chamber travels into the inlet of the post-treatment chamber.

10. A gas stream component abatement or scrubbing system for marine vessel contaminated gas, exhaust gas, or flue gas, comprising:

the pretreatment system of claim 1, wherein the second end of the pretreatment reaction chamber is coupled with a first end or an inlet end of a second reaction chamber;

an inlet for introducing chlorine dioxide into the second reaction chamber, wherein the second reaction chamber is equipped with one or more turbulence inducing devices configured for inducing turbulence, wherein the turbulence inducing device is a stationary device, and wherein the exhaust gas or gas to be treated from the pretreatment reaction chamber travels from the outlet end of the pretreatment reaction chamber to the first end or inlet end of the second reaction chamber; and an inlet for a post-treatment chamber that is coupled with the second end of the second reaction chamber, wherein at least one product of the second reaction chamber travels into the inlet of the post-treatment chamber.

11. The gas stream component abatement or scrubbing system for marine vessel contaminated gas, exhaust gas, or flue gas of claim 10, wherein the at least one product of the second reaction chamber comprises at least one mineral acid.

12. The gas stream component abatement or scrubbing system for marine vessel contaminated gas, exhaust gas, or flue gas of claim 11, wherein seawater, potable water, pure water, or tainted water with additional metal hydroxides, carbonates, bicarbonates, or ammonia compounds are added or introduced to neutralize the at least one mineral acid or convert the at least one mineral acid into another component.

13. A gas stream component abatement or scrubbing system for marine vessel contaminated gas, exhaust gas, or flue gas, comprising:

the pretreatment system of claim 1, wherein the pretreatment reaction chamber is also utilized for scrubbing NOx, SOx, or a combination thereof;

an inlet for introducing chlorine dioxide into the pretreatment reaction chamber, wherein the reaction chamber is equipped with one or more turbulence inducing devices configured for inducing turbulence, wherein the turbulence inducing device is a stationary device, and wherein the exhaust gas remains in the reaction chamber for treatment with non-ionic chlorine dioxide; and an inlet for the introduction of seawater, potable water with additional metal hydroxides, tainted water with additional metal hydroxides, or pure water with additional metal hydroxides in order to neutralize the mineral acids that are produced reaction chamber.

14. The gas stream component abatement or scrubbing system for marine vessel contaminated gas, exhaust gas, or flue gas of claim 13, further comprising an inlet for introducing inorganic and organic sulfur-containing compounds, hydroxides, urea, amine compounds and derivatives thereof into the second reaction chamber.

15. The system of claim 13, wherein a post-treatment process is activated in the post-treatment chamber.

16. The system of claim 15, wherein the post-treatment process comprises an acid neutralization post-treatment process, a sodium nitrate/nitrate production post-treatment process, an ammonium sulfate production post-treatment process, or an ammonium nitrate and ammonium chloride production post-treatment process.

17. The system of claim 16, wherein the sodium nitrate/nitrite, ammonium nitrate and ammonium chloride products are separated out of solution using a thin film dryer, an air dryer, or a similar technology.

18. The system of claim 17, wherein the separated sodium nitrate/nitrite, ammonium nitrate and ammonium chloride products are stored as commercially viable products.

19. The system of claim 18, wherein nitrogen loading in process discharge water is reduced in all products, except ammonium chloride products.

20. A gas stream component abatement or scrubbing system for marine vessel contaminated gas, exhaust gas, or flue gas, wherein the gas stream comprises organic compounds, the system comprising:

the pretreatment system of claim 1, wherein the second end of the pretreatment reaction chamber is coupled with a first end or an inlet end of a second reaction chamber; and an inlet for introducing chlorine dioxide into the second reaction chamber, an inlet for introducing at least one sulfur-based component, compound or group of compounds into the second reaction chamber, wherein the second reaction chamber is equipped with one or more turbulence inducing devices configured for inducing turbulence, wherein the turbulence inducing device is a stationary device, and wherein the exhaust gas or gas to be treated from the first reaction chamber travels from the outlet end of the first reaction chamber to the first end or inlet end of the second reaction chamber.

21. The gas stream component abatement or scrubbing system for marine vessel contaminated gas, exhaust gas, or flue gas of claim 20, wherein the contaminated gas, exhaust gas, or flue gas comprises at least one NOx component, SOx component, organic compound, particulate, particulate matter, or a combination thereof.

22. The gas stream component abatement or scrubbing system for marine vessel contaminated gas, exhaust gas, or flue gas of claim 20, further comprising an inlet for introducing inorganic and organic sulfur-containing compounds, hydroxides, urea, amine compounds and derivatives thereof into the second reaction chamber.

* * * * *